(12) United States Patent
Ishizaki et al.

(10) Patent No.: US 11,378,833 B2
(45) Date of Patent: Jul. 5, 2022

(54) DISPLAY APPARATUS AND INPUT DEVICE

(71) Applicant: Japan Display Inc., Tokyo (JP)

(72) Inventors: Koji Ishizaki, Tokyo (JP); Masanobu Ikeda, Tokyo (JP); Hayato Kurasawa, Tokyo (JP); Yoshihiro Watanabe, Tokyo (JP)

(73) Assignee: Japan Display Inc., Tokyo (JP)

( * ) Notice: Subject to any disclaimer, the term of this patent is extended or adjusted under 35 U.S.C. 154(b) by 2 days.

(21) Appl. No.: 17/004,063

(22) Filed: Aug. 27, 2020

(65) Prior Publication Data
US 2020/0393714 A1     Dec. 17, 2020

Related U.S. Application Data

(63) Continuation of application No. 16/150,672, filed on Oct. 3, 2018, now Pat. No. 10,802,319, which is a
(Continued)

(30) Foreign Application Priority Data

Aug. 20, 2014   (JP) .................................. 2014-167596
Mar. 20, 2015   (JP) .................................. 2015-057114

(51) Int. Cl.
*G02F 1/1333*     (2006.01)
*G06F 3/044*     (2006.01)
*G09G 3/36*     (2006.01)

(52) U.S. Cl.
CPC .......... *G02F 1/13338* (2013.01); *G06F 3/044* (2013.01); *G06F 3/0445* (2019.05);
(Continued)

(58) Field of Classification Search
CPC ............. G02F 1/1643; G02F 1/133512; G02F 1/133528; G02F 1/136295; G02F 1/1345; G02F 1/13458; G02F 1/133345; G02F 1/1626; G02F 1/1333; G02F 1/1343; G02F 1/133334; G02F 1/1339; G02F 1/136209; G02F 1/133308; G02F 1/16;
(Continued)

(56) References Cited

U.S. PATENT DOCUMENTS

| 2012/0015098 A1* | 1/2012 | Cheng | H01L 31/1884 977/932 |
| 2012/0098551 A1* | 4/2012 | Tsukamoto | G06F 3/045 73/431 |

(Continued)

*Primary Examiner* — Nitin Patel
*Assistant Examiner* — Amen W Bogale
(74) *Attorney, Agent, or Firm* — Michael Best & Friedrich LLP

(57) ABSTRACT

A display apparatus includes a first substrate, a second substrate facing the first substrate, lead wirings provided on the first substrate or the second substrate and a first insulator part provided on an upper surface of the second substrate. The lead wirings are arranged in a peripheral region when seen in a plan view and the first insulator part is arranged so as to overlap a display region when seen in a plan view. Second insulator parts or spaces with a permittivity lower than a permittivity of the first insulator part are provided at sides of the first insulator part. The second insulator parts or the spaces are arranged so as to overlap the lead wirings in the peripheral region when seen in a plan view.

4 Claims, 23 Drawing Sheets

Related U.S. Application Data continuation of application No. 14/819,872, filed on Aug. 6, 2015, now Pat. No. 10,133,105.

(52) U.S. Cl.
CPC ......... *G06F 3/0446* (2019.05); *G09G 3/3648* (2013.01); *G09G 2300/0426* (2013.01); *G09G 2310/0232* (2013.01); *G09G 2310/08* (2013.01); *G09G 2330/06* (2013.01)

(58) Field of Classification Search
CPC .... G02F 1/1601; G02F 1/1609; G02F 1/1603; G02F 1/13338; G02F 1/133331; G02F 1/13452; G02F 1/133302; G02F 1/133305; G02F 2201/50; G02F 2202/28; G02F 2202/023; G02F 2202/42; G06F 3/0443; G06F 3/0445; G06F 3/041; G06F 3/0412; G06F 3/044; G06F 3/04164; G06F 3/0446; G06F 3/047; G06F 2203/04103; G06F 2203/04107; G06F 2203/04111; G06F 2203/04112; H05K 3/305; H05K 3/386; H05K 3/4635; H05K 1/0296; H05K 1/0306; H05K 1/0313; H05K 2201/0129; H05K 2201/0195; H05K 2203/0522; H05K 5/0243; H03K 17/96; H03K 17/962; H03K 2217/960755; H03K 2217/960765; H01L 27/323; H01L 24/03; H01L 24/04; H01L 24/05; H01L 24/06; H01L 24/07; H01L 24/08; H01L 24/09; G09G 2300/0426; H01H 11/00; G02B 1/14; G02B 5/3041; B32B 7/05; B32B 7/06; B32B 7/12; B32B 37/12; B32B 37/1284; B32B 2037/1253; B32B 2266/14; B32B 2405/00; B32B 2307/42; C09J 7/00; C09J 7/30; C09J 9/00; C09J 9/005; C09J 11/00; C09J 11/02; C09J 11/04; C09J 11/06; C09J 11/08

See application file for complete search history.

(56) References Cited

U.S. PATENT DOCUMENTS

| | | | |
|---|---|---|---|
| 2014/0138131 A1* | 5/2014 | Hao | G06F 3/044 156/60 |
| 2015/0070604 A1* | 3/2015 | Chen | G06F 3/0446 349/12 |

\* cited by examiner

DISPLAY APPARATUS AND INPUT DEVICE

CROSS-REFERENCE TO RELATED APPLICATIONS

This application is a Continuation of U.S. patent application Ser. No. 16/150,672 filed on Oct. 3, 2018, which, in turn, is a Continuation of application Ser. No. 14/819,872 (now U.S. Pat. No. 10,133,105) filed on Aug. 6, 2015, which claims priority from Japanese Patent Applications No. 2014-167596 filed on Aug. 20, 2014 and No. 2015-057114 filed on Mar. 20, 2015, the contents of which are hereby incorporated by reference into this application.

TECHNICAL FIELD OF THE INVENTION

The present invention relates to a display apparatus and particularly to a display apparatus including an electrostatic capacitive input device.

BACKGROUND OF THE INVENTION

In recent years, a technique of attaching an input device referred to as a touch panel or a touch sensor to a display surface of a display apparatus and sensing and outputting an input position when input operations are performed by contacting the touch panel with a finger or an input tool such as a touch pen has been known. Such display apparatuses having a touch panel do not need an input device such as keyboard, mouse or keypad, and are thus widely used in portable information terminals such as mobile phones in addition to computers.

One sensing method for sensing contact positions which a finger or the like is in contact with the touch panel is the electrostatic capacitance method. In an electrostatic capacitive touch panel, a plurality of capacitive elements each made up of a pair of electrodes disposed to be opposed to each other with a dielectric layer interposed therebetween, that is, a driving electrode and a sensing electrode are provided in a plane of the touch panel. Then, the input positions are sensed by utilizing the characteristics that the electrostatic capacitance of capacitive elements varies when performing input operations by contacting the capacitive elements with a finger or an input tool such as a touch pen.

Such a display apparatus includes a display region and a peripheral region positioned around the display region, and driving electrodes and sensing electrodes for sensing an input position are arranged in the display region. For example, Japanese Patent Application Laid-Open Publication No. 2013-16141 (Patent Document 1) describes a touch screen panel including a thin film substrate which is divided into an active region and an inactive region positioned around the active region and a sensing pattern formed in the active region of the thin film substrate.

SUMMARY OF THE INVENTION

In such a display apparatus, a driving electrode driver including lead wirings electrically connected to the driving electrodes or lead wirings electrically connected to the sensing electrodes are arranged in the peripheral region. Also, a polarization plate, a dielectric body made of resin or the like is provided on an upper surface of a substrate included in an opposing substrate in the display region.

However, if a polarization plate, a dielectric body made of resin or the like is provided on the upper surface of the substrate included in the opposing substrate also in the peripheral region like in the display region, when a finger or an input tool approaches the display apparatus in the peripheral region, capacitance between the lead wirings arranged in the peripheral region and the finger or input tool relatively increases. Therefore, when a finger or an input tool approaches the display apparatus in the peripheral region, noises from the finger or input tool are likely to be transmitted to the lead wirings and signals detected through the lead wirings are likely to be affected by the noises, so that a ratio of a signal intensity to a noise intensity decreases and a sensing performance of the input device cannot be improved.

The present invention has been made in order to solve the problems of the conventional technique as described above, and an object thereof is to provide a display apparatus provided with an input device, in which signals detected by the input device when a finger or an input tool approaches the display apparatus in a peripheral region are less likely to be affected by the noises.

The following is a brief description of an outline of the typical invention disclosed in the present application.

A display apparatus as an aspect of the present invention includes: a first substrate; a second substrate facing the first substrate; a plurality of pixels provided on the first substrate; a first wiring provided on the first substrate or the second substrate; a first insulator part provided on a first main surface of the second substrate; and a second insulator part or a space provided at a side of the first insulator part. The second insulator part has a permittivity lower than a permittivity of the first insulator part. The plurality of pixels are arranged in a first region on the first main surface of the second substrate when seen in a plan view, the first wiring is arranged in a second region positioned on an outer peripheral side of the second substrate relative to the first region on the first main surface of the second substrate when seen in a plan view, and the first insulator part is arranged so as to overlap the first region when seen in a plan view. The second insulator part or the space is arranged so as to overlap the first wiring in the second region when seen in a plan view. An input position is sensed by detecting signals through the first wiring.

BRIEF DESCRIPTIONS OF THE DRAWINGS

DESCRIPTIONS OF THE PREFERRED EMBODIMENTS

Figure 1:
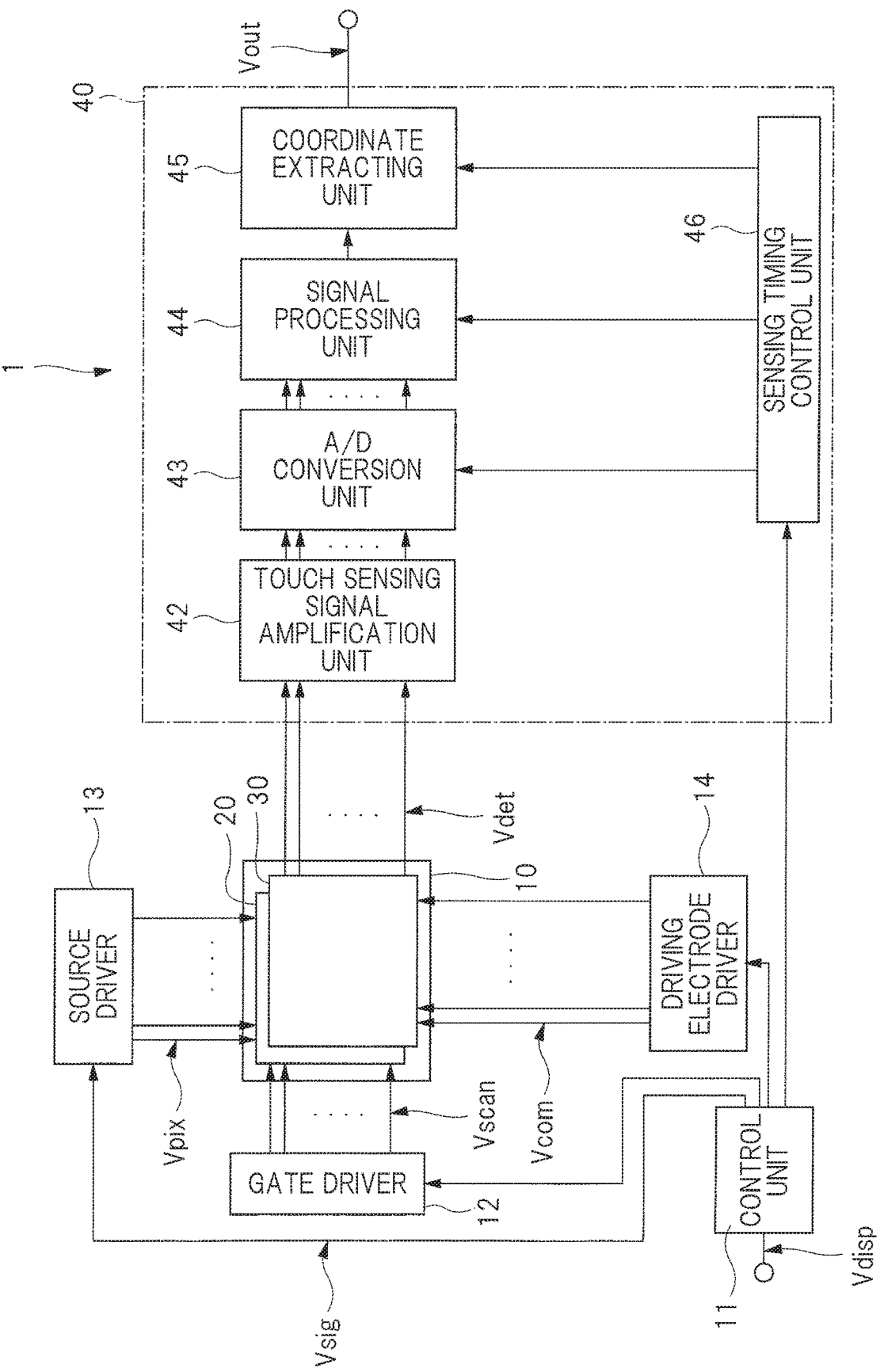
FIG. 1 is a block diagram illustrating a configuration example of a display apparatus according to the first embodiment.

Hereinafter, each embodiment according to the present invention will be described with reference to the drawings. The disclosure is provided just by way of example, and appropriate modifications capable of being readily assumed by those skilled in the art may fall within the scope of the invention without departing from the spirit of the invention. Further, widths, thicknesses, shapes and the like of the respective components are sometimes schematically illustrated in the drawings relative to the embodiments in order to further clarify the descriptions, but these are merely examples and are not intended to limit the present invention.

In the present specification and the drawings, the same components as those previously described in the drawings are denoted by the same reference characters, and detailed descriptions thereof may be omitted as needed.

Further, in the drawings used for the embodiments, hatching may be omitted even in the cross-sectional views for making the drawings easy to see. Also, hatching may be given even to the plan views for making the drawings easy to see.

Moreover, in the embodiments described below, when a range is indicated as A to B, that range means A or more and B or less unless otherwise mentioned.

First Embodiment

First, an example in which a display apparatus provided with a touch panel as an input device is applied to an in-cell liquid crystal display apparatus with a touch sensing function will be described as the first embodiment. Note that, in this specification, the input device indicates an input device which senses at least an electrostatic capacitance varied depending on a capacitance of an object that approaches or is in contact with an electrode. In addition, the liquid crystal display apparatus with a touch sensing function indicates a liquid crystal display apparatus in which a sensing electrode for touch sensing is provided on either one of an array substrate and an opposing substrate that form the display apparatus. Furthermore, in this first embodiment, an in-cell display apparatus with a touch sensing function which is characterized in that a driving electrode is provided so as to operate as a driving electrode of the display apparatus and also as a driving electrode of the input device will be described.

<Overall Configuration>

First, the overall configuration of the display apparatus according to the present first embodiment will be described with reference to FIG. 1. FIG. 1 is a block diagram illustrating a configuration example of a display apparatus according to the first embodiment.

A display apparatus 1 includes a display device 10 with a touch sensing function, a control unit 11, a gate driver 12, a source driver 13, a driving electrode driver 14 and a touch sensing unit 40.

The display device 10 with a touch sensing function includes a display device 20 and a touch sensing device 30. In the first embodiment, the display device 20 is a display device using liquid crystal display elements as display elements. Therefore, hereinafter, the display device 20 is referred to as a liquid crystal display device 20 in some cases. The touch sensing device 30 is a touch sensing device of electrostatic capacitance type, that is, an electrostatic capacitive touch sensing device. Therefore, the display apparatus 1 is a display apparatus including an input device with a touch sensing function. Further, the display device 10 with a touch sensing function is a display device in which the liquid crystal display device 20 and the touch sensing device 30 are integrated, and is a display device incorporating a touch sensing function, namely, an in-cell display device with a touch sensing function.

Further, the display device 10 with a touch sensing function may be a display device in which the touch sensing device 30 is attached on the display device 20. Also, the display device 20 may be an organic EL (Electroluminescence) display device instead of the display device using the liquid crystal display element.

The display device 20 performs display by sequentially scanning each horizontal line in the display region in accordance with scanning signals Vscan supplied from the gate driver 12. The touch sensing device 30 operates in accordance with a principle of electrostatic capacitive touch sensing and outputs sensing signals Vdet as described later.

The control unit 11 is a circuit which respectively supplies control signals to the gate driver 12, the source driver 13, the driving electrode driver 14 and the touch sensing unit 40 based on video signals Vdisp supplied from outside for controlling them so that they are operated in synchronization with each other.

The gate driver 12 has a function of sequentially selecting one horizontal line, which is an object of display driving of the display device 10 with a touch sensing function, based on control signals supplied from the control unit 11.

The source driver 13 is a circuit which supplies pixel signals Vpix to sub-pixels SPix included in the display device 10 with a touch sensing function (see FIG. 7 to be described later) based on control signals of image signals Vsig supplied from the control unit 11.

The driving electrode driver 14 is a circuit which supplies driving signals Vcom to driving electrodes COML included in the display device 10 with a touch sensing function (see FIG. 5 or FIG. 6 to be described later) based on the control signals supplied from the control unit 11.

The touch sensing unit 40 is a circuit which senses presence/absence of touches of a finger or an input tool such as a touch pen to the touch sensing device 30, namely, a state of contact or approach to be described later based on control signals supplied from the control unit 11 and sensing signals Vdet supplied from the touch sensing device 30 of the display device 10 with a touch sensing function. Also, the touch sensing unit 40 is a circuit which obtains coordinates of touches, namely, input positions in the touch sensing region in the case where the touches are present. The touch sensing unit 40 includes a touch sensing signal amplifying unit 42, an A/D (Analog/Digital) converting unit 43, a signal processing unit 44, a coordinate extracting unit 45 and a sensing timing control unit 46.

The touch sensing signal amplifying unit 42 amplifies sensing signals Vdet supplied from the touch sensing device 30. The touch sensing signal amplifying unit 42 may be provided with a low pass analog filter which removes high frequency components, namely, noise components included in the sensing signals Vdet and extracts and respectively outputs touch components.

<Principle of Electrostatic Capacitive Touch Sensing>

Figure 2:
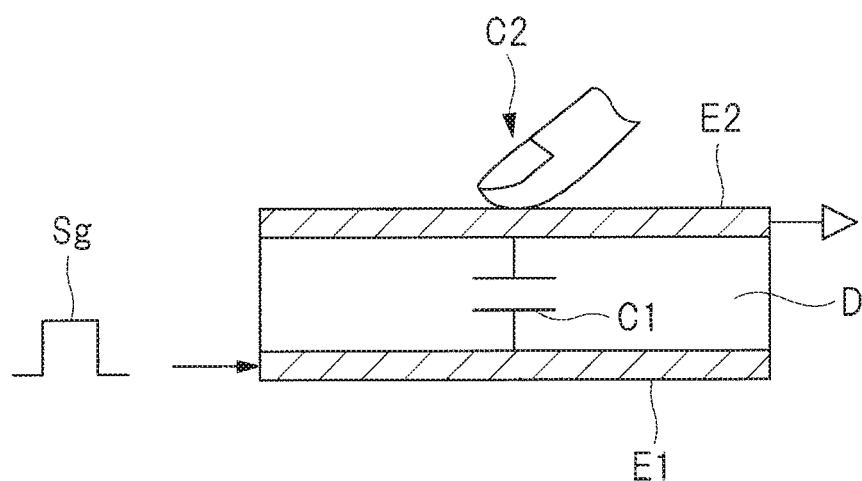
FIG. 2 is an explanatory diagram illustrating a state in which a finger is in contact with or approaches a touch sensing device.
Figure 3:
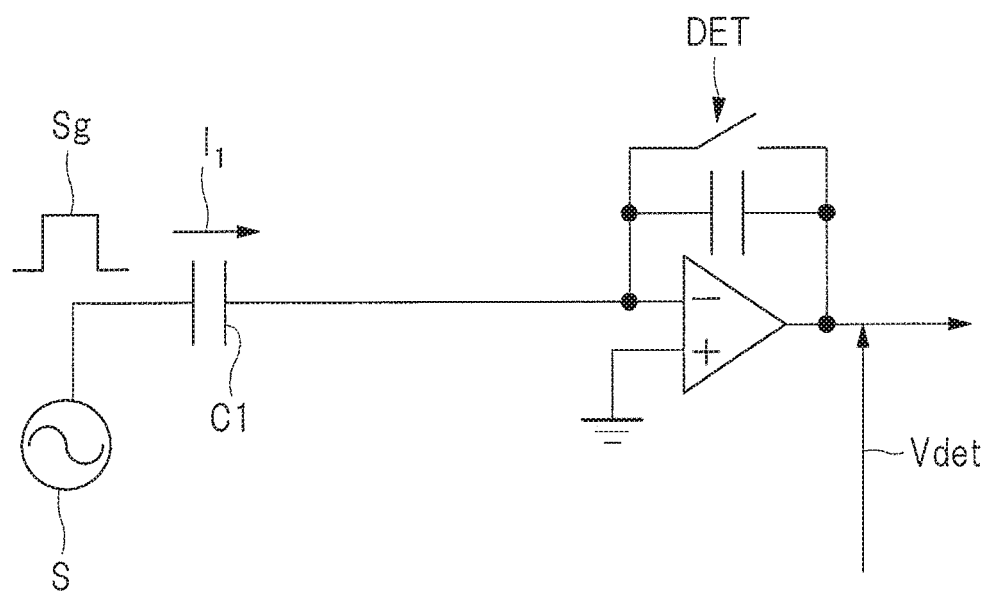
FIG. 3 is an explanatory diagram illustrating an example of an equivalent circuit in a state in which a finger is in contact with or approaches the touch sensing device.
Figure 4:
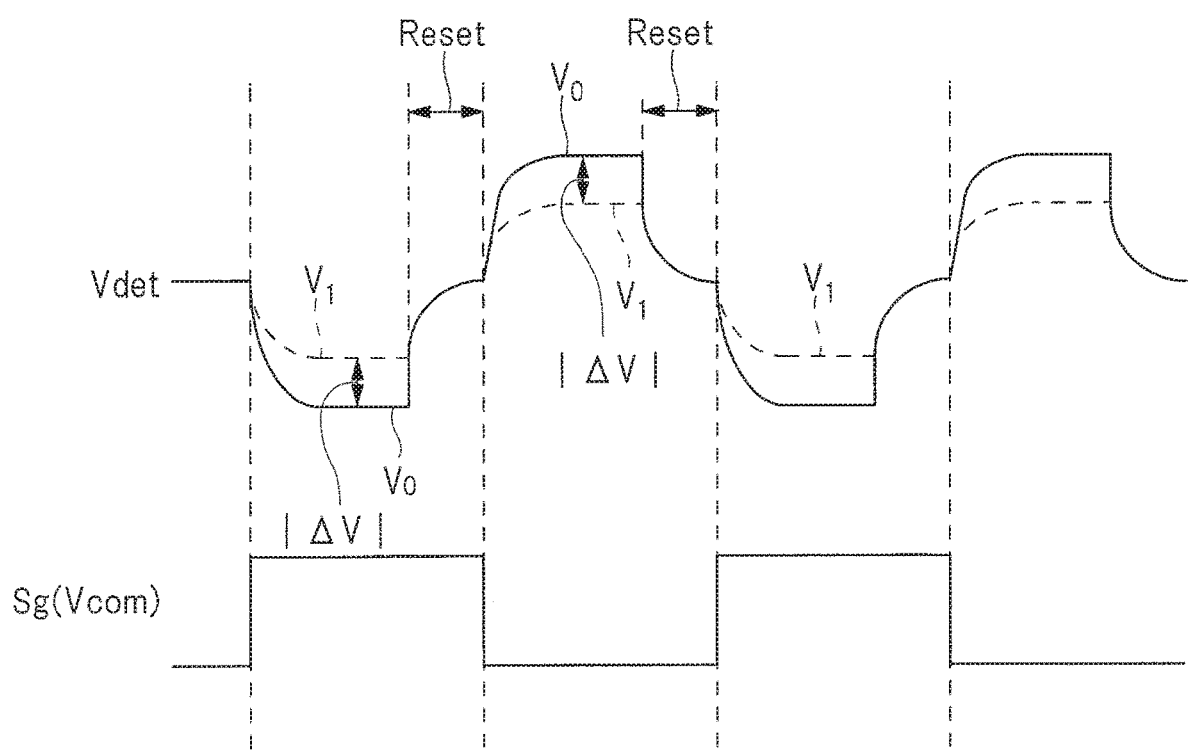
FIG. 4 is a diagram illustrating an example of waveforms of a driving signal and a sensing signal.

Next, the principle of touch sensing in the display apparatus 1 according to the present first embodiment will be described with reference to FIG. 1 to FIG. 4. FIG. 2 is an explanatory diagram illustrating a state in which a finger is in contact with or approaches a touch sensing device. FIG. 3 is an explanatory diagram illustrating an example of an equivalent circuit in a state in which a finger is in contact with or approaches the touch sensing device. FIG. 4 is a diagram illustrating an example of waveforms of a driving signal and a sensing signal.

As illustrated in FIG. 2, in the electrostatic capacitive touch sensing, an input device referred to as a touch panel or a touch sensor includes a driving electrode E1 and a sensing electrode E2 which are disposed to be opposed to each other with a dielectric body P interposed therebetween.

A capacitive element C1 is formed by the driving electrode E1 and the sensing electrode E2. As illustrated in FIG. 3, one end of the capacitive element C1 is connected to an AC signal source S which is a driving signal source, and the other end of the capacitive element C1 is connected to a voltage sensor DET which is the touch sensing unit. The voltage sensor DET is, for example, an integrating circuit included in the touch sensing signal amplifying unit 42 illustrated in FIG. 1.

When an AC rectangular wave Sg having a frequency in the range of, for example, several kHz to several hundreds kHz is applied from the AC signal source S to the one end of the capacitive element C1, namely, the driving electrode E1, a sensing signal Vdet which is an output waveform is generated via the voltage sensor DET connected to the other end of the capacitive element C1, namely, the sensing electrodes E2. Note that the AC rectangular wave Sg corresponds to, for example, the driving signal Vcom illustrated in FIG. 4.

In the state in which no finger contacts or approaches, namely, in the non-contact state, current $I_1$ corresponding to the capacitance value of the capacitive element C1 flows in accordance with charge and discharge of the capacitive element C1 as illustrated in FIG. 3. The voltage sensor DET converts the fluctuation in the current $I_1$ in accordance with the AC rectangular wave Sg into the fluctuation in voltage. The voltage fluctuation is represented as the waveform $V_0$ indicated by a solid line in FIG. 4.

On the other hand, in a state in which a finger is in contact or approaches, namely, in the contact state, the capacitance value of the capacitive element C1 formed of the driving electrode E1 and the sensing electrode E2 decreases due to the influence from the electrostatic capacitance C2 formed by the finger. Therefore, the current $I_1$ flowing in the capacitive element C1 illustrated in FIG. 3 fluctuates. The voltage sensor DET converts the fluctuation in the current $I_1$ in accordance with the AC rectangular wave Sg into the fluctuation in voltage. This voltage fluctuation is represented as the waveform $V_1$ indicated by a broken line in FIG. 4. In this case, the amplitude of the waveform $V_1$ is smaller than that of the above-described waveform $V_0$. Accordingly, the absolute value $|\Delta V|$ of the voltage difference between the waveform $V_0$ and the waveform $V_1$ is varied in accordance with influences of an object approaching from outside such as a finger. Note that, in order to accurately sense the absolute value $|\Delta V|$ of the voltage difference between the waveform $V_0$ and the waveform $V_1$, it is preferable that a period Reset during which charge and discharge of the capacitor are reset in accordance with a frequency of the AC rectangular wave Sg by the switching in the circuit is provided in the operation of the voltage sensor DET.

In the example illustrated in FIG. 1, the touch sensing device 30 performs touch sensing for each sensing block corresponding to one or a plurality of driving electrodes COML (see FIG. 5 or FIG. 6 described later) in accordance with the driving signal Vcom supplied from the driving electrode driver 14. More specifically, the touch sensing device 30 outputs the sensing signal Vdet via the voltage sensor DET illustrated in FIG. 3 for each sensing block corresponding to each of the one or a plurality of driving electrodes COML, and supplies the output sensing signal Vdet to the touch sensing signal amplifying unit 42 of the touch sensing unit 40.

The A/D converting unit 43 is a circuit which samples each analog signal output from the touch sensing signal amplifying unit 42 at a timing in synchronization with the driving signal Vcom, thereby converting into a digital signal.

The signal processing unit 44 is provided with a digital filter which reduces frequency components other than the frequency at which the driving signal Vcom is sampled, namely, noise components included in the output signal of the A/D converting unit 43. The signal processing unit 44 is a logic circuit which senses presence/absence of touches to the touch sensing device 30 based on the output signal of the A/D converting unit 43. The signal processing unit 44 performs the process of extracting only differential voltage caused by the finger. The differential voltage caused by the finger is the absolute value $|\Delta V|$ of the difference between the waveform $V_0$ and the waveform $V_1$ mentioned above. It is also possible that the signal processing unit 44 performs calculations of averaging absolute values $|\Delta V|$ per each sensing block to obtain the average value of the absolute values $|\Delta V|$. By this means, the signal processing unit 44 can reduce the influences of noise. The signal processing unit 44 compares the sensed differential voltage caused by the finger with a predetermined threshold voltage, and when the voltage is equal to or higher than the threshold voltage, it is determined to be the contact state of an externally approaching object which approaches from outside, and when the voltage is lower than the threshold voltage, it is determined to be the non-contact state of an externally approaching object. In this manner, touch sensing is performed by the touch sensing unit 40.

The coordinate extracting unit 45 is a logic circuit which obtains the coordinates of the position at which the touch has been sensed by the signal processing unit 44, namely, the input position on the touch panel. The sensing timing control unit 46 controls the A/D converting unit 43, the signal processing unit 44 and the coordinate extracting unit 45 so that they are operated in synchronization with each other. The coordinate extracting unit 45 outputs the touch panel coordinates as a signal output Vout.

<Module>

Figure 5:
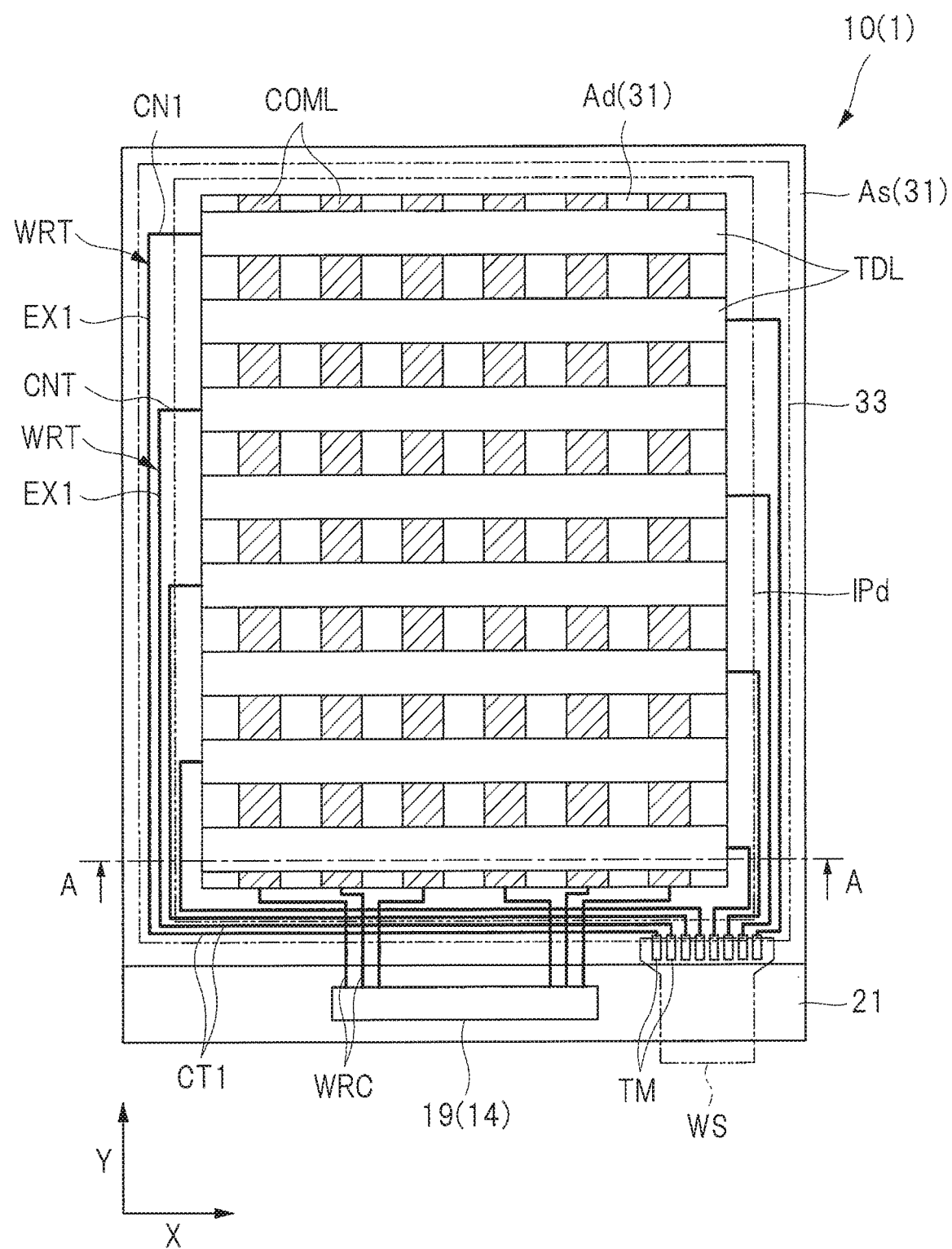
FIG. 5 is a plan view illustrating an example of a module having the display apparatus according to the first embodiment incorporated therein.

FIG. 5 is a plan view illustrating an example of a module having the display apparatus according to the first embodiment incorporated therein. As illustrated in FIG. 5, the display device 10 with a touch sensing function according to the first embodiment has a substrate 21, a substrate 31, a plurality of driving electrodes COML and a plurality of sensing electrodes TDL. The substrate 31 has an upper surface serving as one main surface and a lower surface serving as the other main surface. Here, two directions which mutually intersect preferably orthogonally, with each other within the upper surface of the substrate 31 or the lower surface of the substrate 31 are defined to be an X axis direction and a Y axis direction. At this time, the plurality of driving electrodes COML respectively extend in the Y axis direction and are arrayed in the X axis direction when seen in a plan view. Further, the plurality of sensing electrodes TDL respectively extend in the X axis direction and are arrayed in the Y axis direction when seen in a plan view.

As will be described later with reference to FIG. 7, each of the plurality of driving electrodes COML is provided so as to overlap the plurality of sub-pixels SPix arrayed in the Y axis direction when seen in a plan view. More specifically, one driving electrode COML is provided as a common electrode for the plurality of sub-pixels SPix.

Note that the expression "when seen in a plan view" in the present specification indicates the case in which components are seen from a direction perpendicular to the upper surface serving as the main surface of the substrate 31 or the substrate 21.

In the example illustrated in FIG. 5, the display device 10 with a touch sensing function has a rectangular shape with two sides which respectively extend in the X axis direction and are opposed to each other and two sides which respectively extend in the Y axis direction and are opposed to each other when seen in a plan view. Terminal parts TM are provided on one side of the display device 10 with a touch sensing function in the Y axis direction. The terminal parts TM and the plurality of sensing electrodes TDL are electrically connected by lead wirings WRT, respectively. The terminal part TM is electrically connected to the wiring substrate WS, and the wiring substrate WS is connected to the touch sensing unit 40 (see FIG. 1) mounted to the outside of this module. Accordingly, the sensing electrode TDL is connected to the touch sensing unit 40 via the lead wiring WRT, the terminal part TM and the wiring substrate WS.

The display device 10 with a touch sensing function has a chip on glass (COG) 19. The COG 19 is a chip mounted on the substrate 21 and it incorporates respective circuits required for the display operation such as the control unit 11, the gate driver 12 and the source driver 13 illustrated in FIG. 1. In addition, the COG 19 may incorporate the driving electrode driver 14. The COG 19 and each of the plurality of driving electrodes COML are electrically connected by the lead wiring WRC.

Note that various transparent substrates, for example, a glass, substrate, a film made of resin or the like may be used as the substrate 21 and the substrate 31. In addition, in this specification, the expression "transparent" in the transparent substrate means that transmittance with respect to the visible light is, for example, 80% or more.

<Display Device with Touch Sensing Function>

Figure 6:
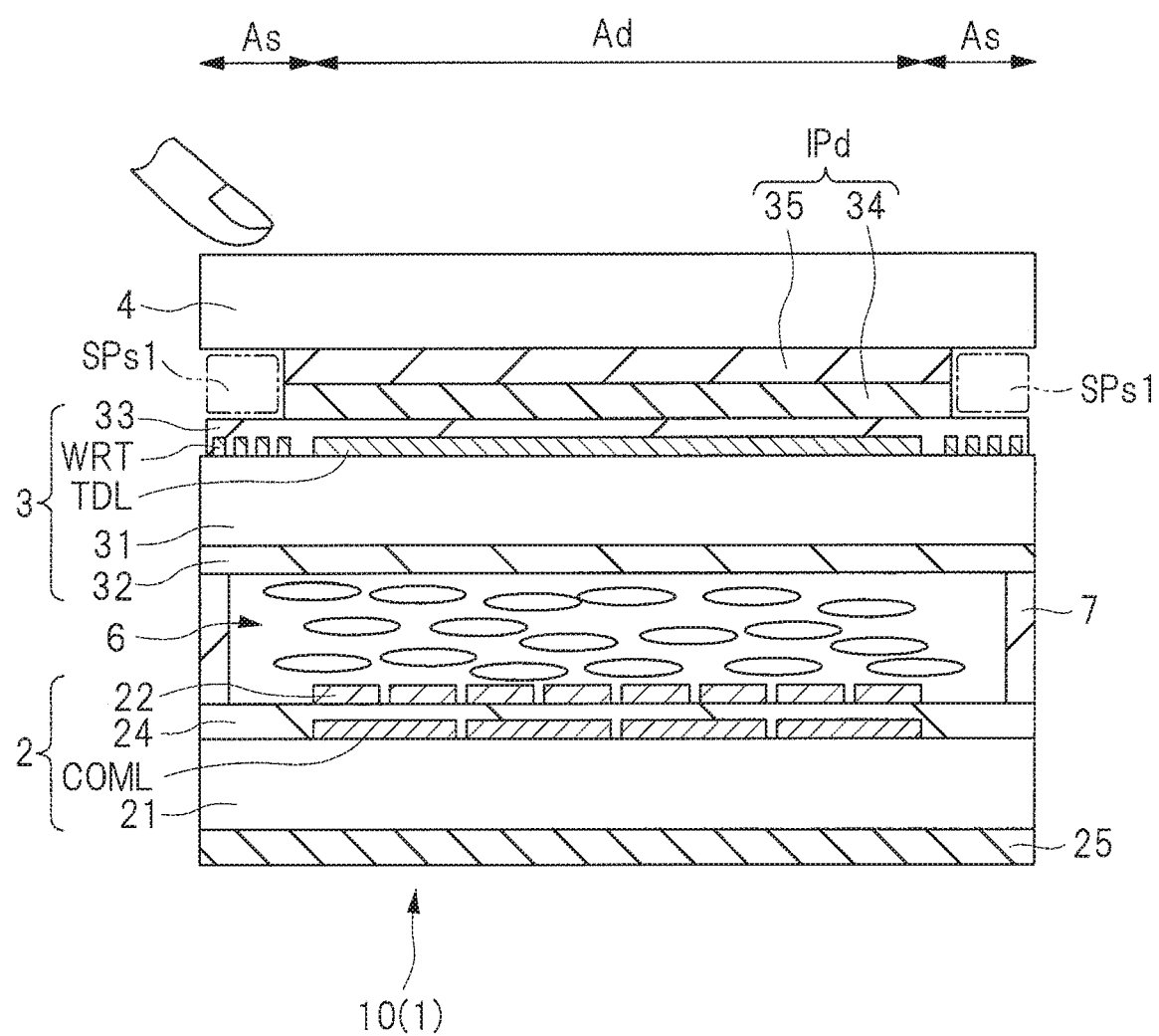
FIG. 6 is a cross-sectional view illustrating a display device with a touch sensing function in the display apparatus according to the first embodiment.

Next, the configuration example of the display device 10 with a touch sensing function will be described in detail with reference to FIGS. 5 to 8. FIG. 6 is a cross-sectional view illustrating the display device with a touch sensing function of the display apparatus according to the first embodiment. FIG. 7 is a circuit diagram illustrating the display device with a touch sensing function of the display apparatus according to the first embodiment. FIG. 8 is a perspective view illustrating a configuration example of the driving electrode and the sensing electrode of the display apparatus according to the first embodiment. FIG. 6 is a cross-sectional view taken along the line A-A of FIG. 5.

The display device 10 with a touch sensing function has an array substrate 2, an opposing substrate 3, a cover plate 4, a liquid crystal layer 6 and a sealing part 7. The opposing substrate 3 is disposed so that an upper surface serving as a main surface of the array substrate 2 and a lower surface serving as a maim surface of the opposing substrate 3 face each other. The liquid crystal layer 6 is provided between the array substrate 2 and the opposing substrate 3. The sealing part 7 is provided between an outer peripheral portion of the array substrate 2 and an outer peripheral portion of the opposing substrate 3, and an outer peripheral portion of a space between the array substrate 2 and the opposing substrate 3 is sealed with the sealing part. Then, the space whose outer peripheral portion is sealed with the sealing part is filled with the liquid crystal layer 6.

The array substrate 2 has the substrate 21, and the opposing substrate 3 has the substrate 31.

The substrate 31 has the upper surface serving as one main surface and the upper surface of the substrate 31 includes a display region Ad and a peripheral region As positioned on the outer peripheral side of the substrate 31 relative to the display region Ad. Therefore, the peripheral region As is the region of the upper surface of the substrate 31 and is positioned on the outer peripheral side of the substrate 31 relative to the display region Ad. Also, the display region Ad and the peripheral region As may be included in the lower surface serving as the other main surface of the substrate 31.

Alternatively, the display region Ad and the peripheral region As may be included in the upper surface serving as one main surface of the substrate 21. At this time, the substrate 21 has an upper surface serving as one main surface and the upper surface of the substrate 21 has the display region Ad and the peripheral region As as the region positioned on an outer peripheral side of the substrate 21 relative to the display region Ad. Therefore, the peripheral region As is the region of the upper surface of the substrate 21 and is positioned on the outer peripheral side of the substrate 21 relative to the display region Ad.

Figure 7:
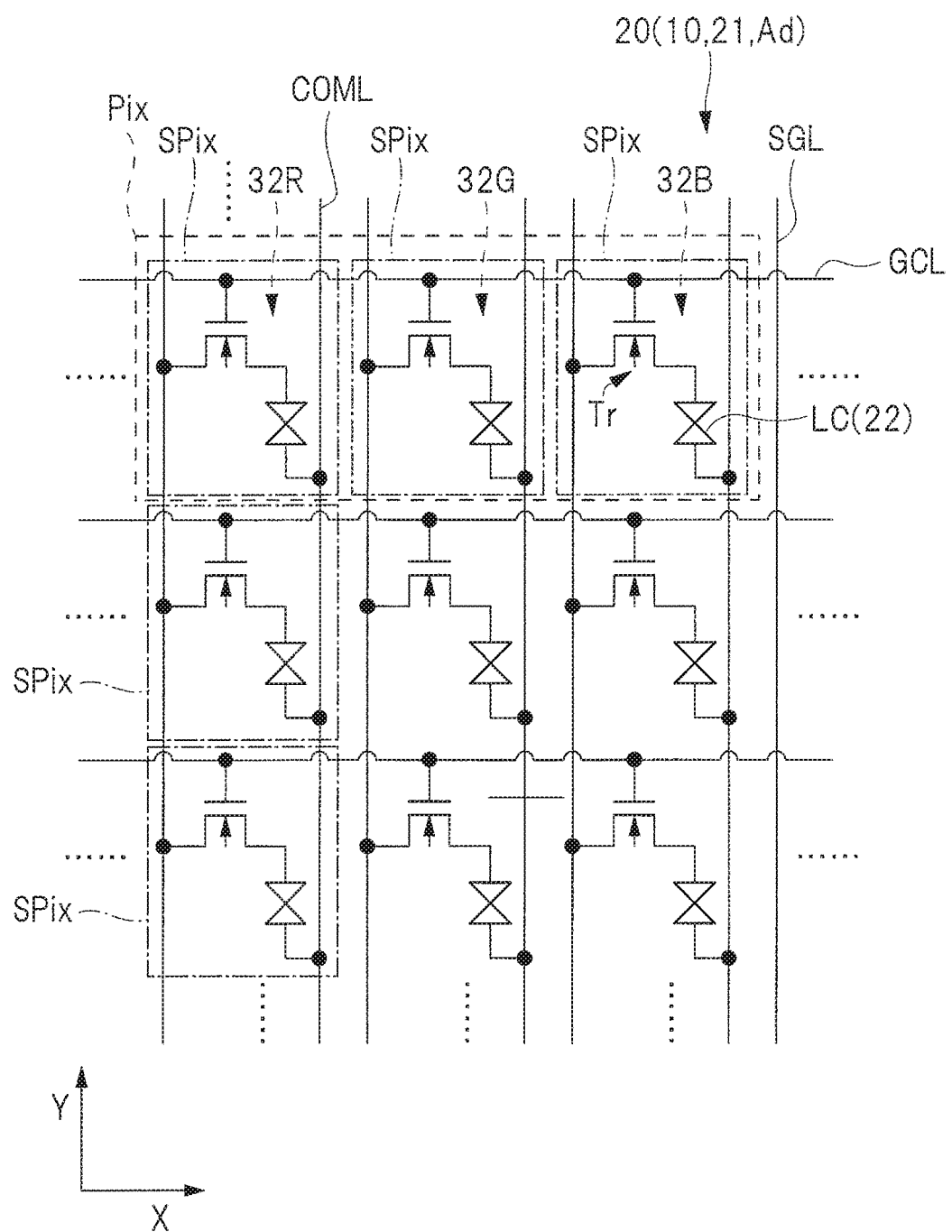
FIG. 7 is a circuit diagram illustrating the display device with a touch sensing function in the display apparatus according to the first embodiment.
Figure 8:
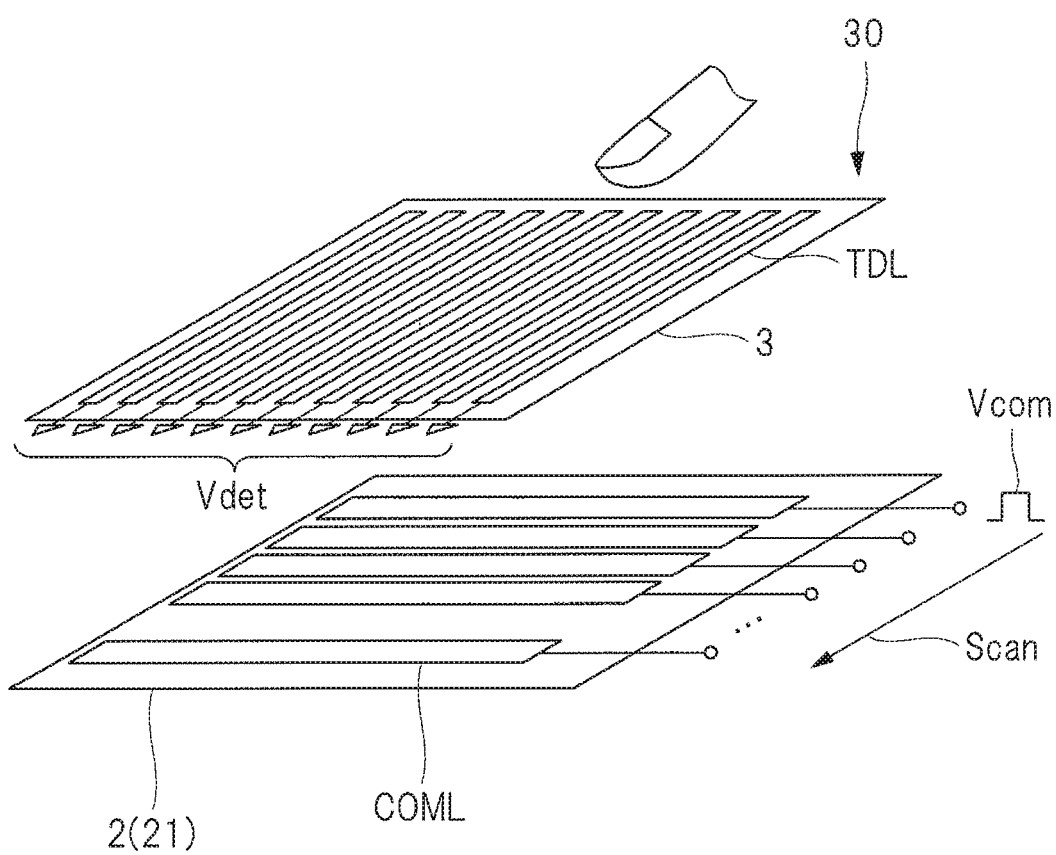
FIG. 8 is a perspective view illustrating a configuration example of driving electrodes and sensing electrodes in the display apparatus according to the first embodiment.

As illustrated in FIG. 7, in the display region Ad, a plurality of scanning lines GCL, a plurality of signal lines SGL and a plurality of TFT elements Tr which are thin film transistors (TFT) are formed on the substrate 21. Note that, in FIG. 6, the illustrations of the scanning lines GCL, the signal lines SGL and the TFT elements Tr are omitted. In addition, the scanning line means a gate wiring and the signal line means a source wiring.

As illustrated in FIG. 7, the plurality of scanning lines GCL respectively extend in the X axis direction and are arrayed in the Y axis direction in the display region Ad. The plurality of signal lines SGL respectively extend in the Y axis direction and are arrayed in the X axis direction in the display region Ad. Accordingly, each of the plurality of signal lines SGL intersects with the plurality of scanning lines GCL when seen in a plan view. In this manner, sub-pixels SPix are arranged at intersections between the plurality of scanning lines GCL and the plurality of signal lines SGL which intersect with each other when seen in a plan view, and a single pixel Pix is formed from a plurality of sub-pixels SPix having different colors. More specifically, the plurality of sub-pixels SPix are provided on the substrate 21, and arranged in the display region Ad and arrayed in a matrix form in the X axis direction and the Y axis direction when seen in a plan view.

The TFT element Tr is formed at an intersecting portion at which each of the plurality of scanning lines GCL and each of the plurality of signal lines SGL intersect with each other when seen in a plan view. Accordingly, in the display region Ad, the plurality of TFT elements Tr are formed on the substrate 21, and the plurality of TFT elements Tr are arrayed in a matrix form in the X axis direction and the Y axis direction. More specifically, each of the plurality of sub-pixels SPix is provided with the TET element Tr. Also, each of the plurality of sub-pixels SPix is provided with a liquid crystal element LC in addition to the TFT element Tr.

The TFT element Tr is made up of, for example, a thin film transistor such as a n-channel MOS (Metal Oxide Semiconductor). The gate electrode of the TFT element Tr is connected to the scanning line GCL. One of the source electrode and the drain electrode of the TFT element Tr is connected to the signal line SGL. The other one of the source electrode and the drain electrode of the TFT element Tr is connected to one end of the liquid crystal element LC. One end of the liquid crystal element LC is connected to the source electrode or the drain electrode of the TFT element Tr, and the other end thereof is connected to the driving electrode COML.

As illustrated in FIG. 5 and FIG. 6, the array substrate 2 includes the plurality of driving electrodes COML, the lead wirings WRC, an insulating film 24 and a plurality of pixel electrodes 22. The plurality of driving electrodes COML are provided on the upper surface serving as one main surface of the substrate 21 in the display region Ad when seen in a plan view. The lead wirings WRC are wirings far electrically connecting the driving electrodes COML and the COG 19 (see FIG. 5), and are formed on the upper surface serving as one main surface of the substrate 21 in the peripheral region As when seen in a plan view. The insulating film 24 is formed on the upper surface of the substrate 21 with the inclusion of the surfaces of the plurality of driving electrodes COML and the surfaces of the plurality of lead wirings WRC. In the display region Ad, the plurality of pixel electrodes 22 are formed on the insulating film 24. Accordingly, the insulating film 24 electrically insulates the driving electrodes COML and the pixel electrodes 22.

As illustrated in FIG. 6 and FIG. 7, each of the plurality of pixel electrodes 22 is formed in each of the plurality of sub-pixels SPix arrayed in a matrix form in the X axis direction and the Y axis direction in the display region Ad when seen in a plan view. Accordingly, the plurality of pixel electrodes 22 are arrayed in a matrix form in the X axis direction and the Y axis direction.

In the example illustrated in FIG. 6, each of the plurality of driving electrodes COML is formed between the substrate 21 and the pixel electrodes 22. Also, as schematically illustrated in FIG. 7, each of the plurality of driving electrodes COML is provided so as to overlap the plurality of pixel electrodes 22 when seen in a plan view. Then, by applying voltage between each of the plurality of pixel electrodes 22 and each of the plurality of driving electrodes COML so that an electric field is formed in the liquid crystal element LC provided in each of the plurality of sub-pixels SPix, an image is displayed in the display region Ad.

When the display device 10 with a touch sensing function includes the liquid crystal display device 20 as described above, a display control unit for controlling the image display is formed of the liquid crystal element LC, the plurality of pixel electrodes 22, the driving electrode COML, the plurality of scanning lines GCL and the plurality of signal lines SGL. The display control unit is provided between the array substrate 2 and the opposing substrate 3. Note that the display device 10 with a touch sensing function may include various display devices such as organic EL (ElectroLuminescence) display device instead of the liquid crystal display device 20 as the liquid crystal display apparatus (the same is true of the second embodiment).

Each of the plurality of driving electrodes COWL may be formed on the opposite side of the substrate 21 with the pixel electrode 22 interposed therebetween. In addition, in the example illustrated in FIG. 6, the arrangement of the driving electrodes COML and the pixel electrodes 22 is formed as the arrangement in a fringe field switching (FFS) mode as a transverse electric field mode. However, the arrangement of the driving electrodes COML and the pixel electrodes 22 may be formed as the arrangement in an in-plane switching (IPS) mode as the transverse electric field mode in which the driving electrodes COML do not overlap the pixel electrodes 22 when seen in a plan view. Alternatively, the arrangement of the driving electrodes COML and the pixel electrodes 22 may be formed as the arrangement in a twisted nematic (TN) mode, a vertical alignment (VA) mode or the like as a vertical electric field mode (the same is true of the second embodiment).

The liquid crystal layer 6 is configured to modulate light passing therethrough in accordance with the state of the electric field, and a liquid crystal layer adapted to a transverse electric field mode such as a FFS mode or an IPS mode described above is used. More specifically, a liquid crystal display device of a transverse electric field mode such as the FFS mode or the IPS mode is used as the liquid crystal display device 20. Alternatively, as described above, a liquid crystal display device adapted to a vertical electric field mode such as the TN mode or the VA mode may be used. Note that an alignment film may be provided between the liquid crystal layer 6 and the array substrate 2 and between the liquid crystal layer 6 and the opposing substrate 3 illustrated in FIG. 6, respectively (the same is true of the second embodiment).

As illustrated in FIG. 7, the plurality of sub-pixels SPix arrayed in the X axis direction, that is, the plurality of sub-pixels SPix which belong to the same row of the liquid crystal display device 20 are connected to each other by the scanning line GCL. The scanning lines GCL are connected to the gate driver 12 (see FIG. 1) and scanning signals Vscan (see FIG. 1) are supplied thereto from the gate driver 12. Also, the plurality of sub-pixels SPix arrayed in the Y axis direction, that is, the plurality of sub-pixels SPix which belong to the same column of the liquid crystal display device 20 are connected to each other by the signal line SGL. The signal lines SGL, are connected to the source driver 13 (see FIG. 1) and pixel signals Vpix (see FIG. 1) are supplied thereto from the source driver 13.

The driving electrodes COML are connected to the driving electrode driver 14 (see FIG. 5) and driving signals Vcom (see FIG. 1) are supplied thereto from the driving electrode driver 14. In other words, in the example illustrated in FIG. 7, the plurality of sub-pixels SPix which belong to the same column share one driving electrode COML. The plurality of driving electrodes COML respectively extend in the Y axis direction and are arrayed in the X axis direction in the display region Ad. As described above, since the plurality of signal lines SGL respectively extend in the Y axis direction and are arrayed in the X axis direction in the display region Ad, the direction in which each of the plurality of driving electrodes COML extends is parallel to the direction in which each of the plurality of signal lines SGL extends.

Note that, since the driving electrodes COML extend in the Y axis direction when seen in a plan view, the lead wirings WRC arranged in the peripheral region As when seen in a plan view are illustrated in the plan view of FIG. 5 but are not illustrated in the cross-sectional view of FIG. 6.

Also, the direction in which each of the plurality of driving electrodes COML extends is not limited, and for example, the direction in which each of the plurality of driving electrodes COML extends may be a direction which is parallel to the direction in which each of the plurality of scanning lines GCL extends as described later in the second embodiment.

The gate driver 12 illustrated in FIG. 1 sequentially selects one row, namely, one horizontal line from among the sub-pixels SPix which are arrayed in a matrix form in the liquid crystal display device 20 as an object of display driving by applying the scanning signals Vscan to the gate electrode of the TFT element Tr of each of the sub-pixels SPix via the scanning lines GCL illustrated in FIG. 7. The source driver 13 illustrated in FIG. 1 supplies the pixel signals Vpix to each of the plurality of sub-pixels SPix which constitute one horizontal line sequentially selected by the gate driver 12 via the signal lines SGL illustrated in FIG. 7. Then, displays in accordance with the supplied pixel signals Vpix are made at the plurality of sub-pixels SPix constituting one horizontal line.

The driving electrode driver 14 (see FIG. 5) applies driving signals Vcom to drive the driving electrodes COML for each of the sensing blocks corresponding to one or a plurality of driving electrodes COML.

In the liquid crystal display device 20, the gate driver 12 is driven so as to sequentially scan the scanning lines GCL on time division basis, thereby sequentially selecting the sub-pixels SPix for each horizontal line. Also, in the liquid crystal display device 20, the source driver 13 supplies pixel signals Vpix to the sub-pixels SPix which belong to one horizontal line, so that displays are made for each horizontal line. In performing this display operation, the driving electrode driver 14 applies driving signals Vcom to a sensing block including the driving electrodes COML corresponding to the one horizontal line.

The driving electrodes COML of the display apparatus 1 according to the present first embodiment operate as driving electrodes of the liquid crystal display device 20 and operate also as driving electrodes of the touch sensing device 30.

The touch sensing device 30 includes a plurality of driving electrodes COML provided on the array substrate 2 and a plurality of sensing electrodes TDL provided on the opposing substrate 3. The plurality of sensing electrodes TDL respectively extend in the direction which intersects with the direction in which each of the plurality of driving electrodes COML extends when seen in a plan view. In other words, the plurality of sensing electrodes TDL are arrayed at intervals so as to respectively intersect with the plurality of driving electrodes COML when seen in a plan view. Also each of the plurality of sensing electrodes TDL faces the driving electrodes COML in a direction which is perpendicular to the upper surface of the substrate 21 included in the array substrate 2. Each of the plurality of sensing electrodes TDL is respectively connected to the touch sensing signal amplifying unit 42 (see FIG. 1) of the touch sensing unit 40.

Electrostatic capacitance is generated at intersecting portions between each of the plurality of driving electrodes COML and each of the plurality of sensing electrodes into seen in a plan view. Then, signals in accordance with the electrostatic capacitance between each of the plurality of driving electrodes COML and each of the plurality of sensing electrodes TDL are generated, and input positions are sensed by detecting the generated signals through the driving electrode driver 14 including the lead wirings WRC and the lead wirings. More specifically, by the electrode substrate like the substrate 31 on which the sensing electrodes TDL are formed (see FIG. 6) and the driving electrodes COML a sensing unit for sensing the input position, that is, an input device is formed.

With the configuration described above, when performing the touch sensing operation in the touch sensing device 30, one sensing block corresponding to one or a plurality of driving electrodes COML in a scanning direction Scan is sequentially selected by the driving electrode driver 14. Then, in the selected sensing block, driving signals Vcom for measuring the electrostatic capacitance between the driving electrodes COML and the sensing electrodes TDL are input to the driving electrodes COML, and sensing signals Vdet for sensing input positions are output from the sensing electrodes TDL. In this manner, the touch sensing device 30 is configured so as to perform the touch sensing for each sensing block. More specifically, one sensing block corresponds to the driving electrode E1 of the above-described principle of touch sensing, and the sensing electrode TDL corresponds to the sensing electrode E2.

Note that a range of the sensing block at the display operation and a range of the sensing block at the touch sensing operation may be equal to or different from each other.

As illustrated in FIG. 8, the plurality of driving electrodes COML and the plurality of sensing electrodes TDL which intersect with each other when seen in a plan view form an electrostatic capacitive touch sensor having a matrix arrangement. Accordingly, by scanning the entire touch sensing surface of the touch sensing device 30, positions which a finger or the like is in contact with or approaches can be sensed.

Note that, with respect to the touch sensing device 30, it is not limited to the touch sensing device 30 of the mutual capacitance method provided with the common electrodes functioning as the driving electrodes and the sensing electrodes. For example, the touch sensing device 30 of the self-capacitance method provided with only the sensing electrodes may be used as the touch sensing device 30. In the self-capacitance method, when the sensing electrodes TDL are disconnected from the sensing circuit and are electrically connected to a power source, a charge amount is stored in the sensing electrodes TDL. Next, when the sensing electrodes TDL are disconnected from the power source and are electrically connected to the sensing circuit, the charge amount flowing to the sensing circuit is sensed.

Here, in the case where a finger is in contact with or approaches the sensing electrode TDL, the electrostatic capacitance of the sensing electrode TDL varies due to the capacitance of the finger, and the charge amount flowing to the sensing circuit varies when the sensing electrode TDL is connected to the sensing circuit. Accordingly, it is possible to determine whether the finger is in contact with or approaches the sensing electrode TDL by measuring the flowing charge amount by the sensing circuit and sensing the variation of the electrostatic capacitance of the sensing electrode TDL.

As illustrated in FIG. 5 and FIG. 6, the opposing substrate 3 includes the substrate 31, a color filter layer 32, the sensing electrodes TDL, the lead wirings WRT and a protective film 33. The substrate 31 has the upper surface serving as a main surface and the lower surface serving as a main surface opposite to the upper surface. The color filter layer 32 is provided on the lower surface serving as one main surface of the substrate 31. The sensing electrodes TDL are sensing electrodes for the touch sensing device 30, and are provided on the upper surface serving as the other main surface of the substrate 31 in the display region Ad when seen in a plan view. The lead wirings WRT are wirings to electrically connect the sensing electrodes TDL and the terminal parts TM (see FIG. 5), and are formed on the upper surface serving as the other main surface of the substrate 31 in the peripheral region As when seen in a plan view. The protective film 33 provided on the upper surface of the substrate 31 so as to cover the sensing electrodes TDL and the lead wirings WRT.

The sensing electrodes TDL and the lead wirings WRT may be made of metallic materials including metals or transparent conductive materials such as indium tin oxide (ITO), indium zinc oxide (IZO) or tin oxide (SnO).

As illustrated in FIG. 5, a plurality of the sensing electrodes TOL are provided. The plurality of sensing electrodes TDL extend in the X axis direction and are arrayed in the Y axis direction in the display region Ad when seen in a plan view. Also, the terminal parts TM are provided in the peripheral region As positioned on one side of the display region Ad in the Y axis direction. Thus, the lead wirings WRT include extension parts EX1 extending in the Y axis direction. In addition, the lead wirings WRT include connection parts CN1 for connecting the ends of the extension parts EX1 on the side close to the sensing electrode TDL and the sensing electrodes TDL. The connection parts CN1 extend in a direction intersecting with the Y axis direction in which the extension parts EX1 extend, for example, in the X axis direction. The ends of the connection parts CN1 on the side close to the sensing electrode TDL are connected to the sensing electrodes TDL and the ends of the connection parts CN1 on the side close to the terminal part TM are connected to the ends of the extension parts EX1 on the side close to the sensing electrode TDL.

When seen in a plan view, the connection part CN1 is shorter than the extension part EX1, and an area ratio which is a ratio of the area of the connection parts CN1 to the area of the lead wirings WRT is smaller than an area ratio which is a ratio of the area of the extension parts EX1 to the area of the lead wirings WRT. Also, the extension parts EX1 and the connection parts CN1 are provided on the upper surface of the substrate 31 in the peripheral region As. Therefore, each of the plurality of lead wirings WRT is also provided on the upper surface of the substrate 31 in the peripheral region As.

The lead wirings WRT may include connection parts CT1 for connecting the extension parts EX1 and the terminal parts TM depending on a position of the terminal parts TM in the X axis direction. The connection parts CT1 are also provided on the upper-surface of the substrate 31 in the peripheral region As.

For example, color filters colored in three colors of red (R), green (G) and blue (B) are arrayed in the X axis direction as the color filter layer 32. In this manner, as illustrated in FIG. 7, a plurality of sub-pixels SPix corresponding to each of color regions 32R, 32G and 32B of the three colors of R, G and B are formed, and one pixel Pix is formed by one set of the plurality of sub-pixels SPix each corresponding to the color regions 32R, 32G and 32B. The pixels Pix are arrayed in a matrix form in the direction in which the scanning lines GCL extend (X axis direction) and the direction in which the signal lines SGL extend (Y axis direction). Further, the region in which the pixels Pix are arrayed in a matrix form is the above-described display region Ad. Note that a dummy region in which a dummy pixel is provided may be provided in a periphery of the display region Ad.

The combination of colors of the color filter layer 32 may be another combination including a plurality of colors other than R, G and B. It is also possible to provide no color filter layer 32. Alternatively, one pixel Pix may include a sub-pixel SPix which is not provided with the color filter layer 32, that is, a white-colored sub-pixel SPix. In addition, the color filter may be provided on the array substrate 2 by the color filter on array (COA) technique.

As illustrated in FIG. 6, the cover plate 4 as a substrate is provided on the opposite side of the array substrate 2 with the opposing substrate 3 interposed therebetween. More specifically, the cover plate 4 is provided so as to face the upper surface of the opposing substrate 3 in the display region Ad and the peripheral region As. As the cover plate 4, various transparent substrates such as a glass substrate or a film made of resin can be used.

As illustrated in FIG. 6, a polarization plate 25 may be provided on an opposite side of the opposing substrate 3 with the array substrate 2 interposed therebetween.

Each of the plurality of sensing electrodes TDL arrayed in the Y axis direction may have a mesh shape formed by the plurality of conductive lines when seen in a plan view. More specifically, each of the plurality of sensing electrodes TDL has, for example, two conductive lines, and the two conductive lines have a zigzag shape extending in the X axis direction as a whole while being alternately bent in the opposite directions when seen in a plan view, and the parts bent in the opposite directions in the two conductive lines adjacent in the Y axis direction may be coupled with each other. Alternatively, each of the plurality of sensing electrodes TDL, arrayed in the Y axis direction may have a zigzag shape extending in the X axis direction as a whole while being alternately bent in the opposite directions when seen in a plan view.

<Arrangement of Insulator Parts on Protective Film>

Figure 9:
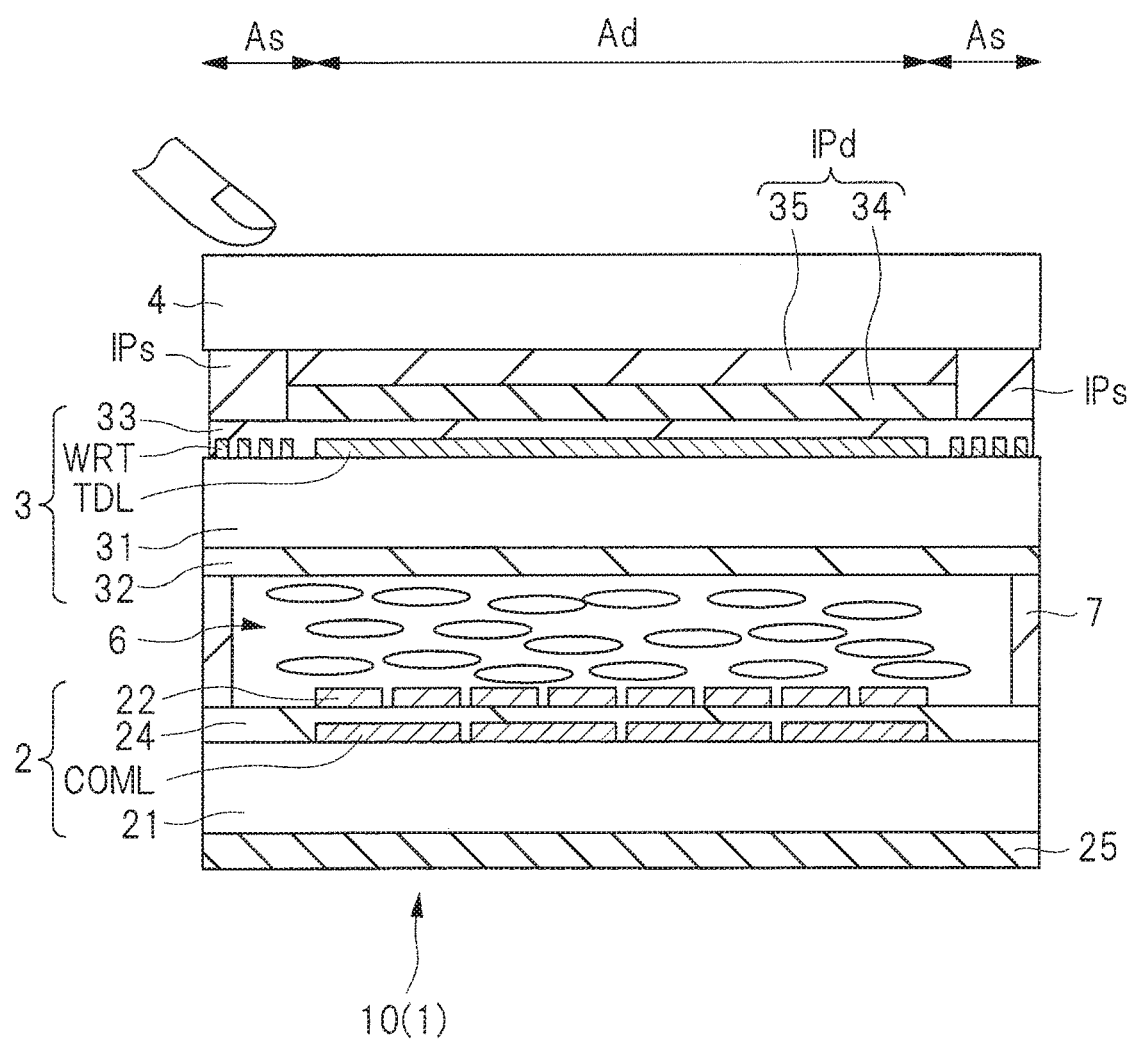
FIG. 9 is a cross-sectional view illustrating another configuration example of the display device with a touch sensing function in the display apparatus according to the first embodiment.
Figure 10:
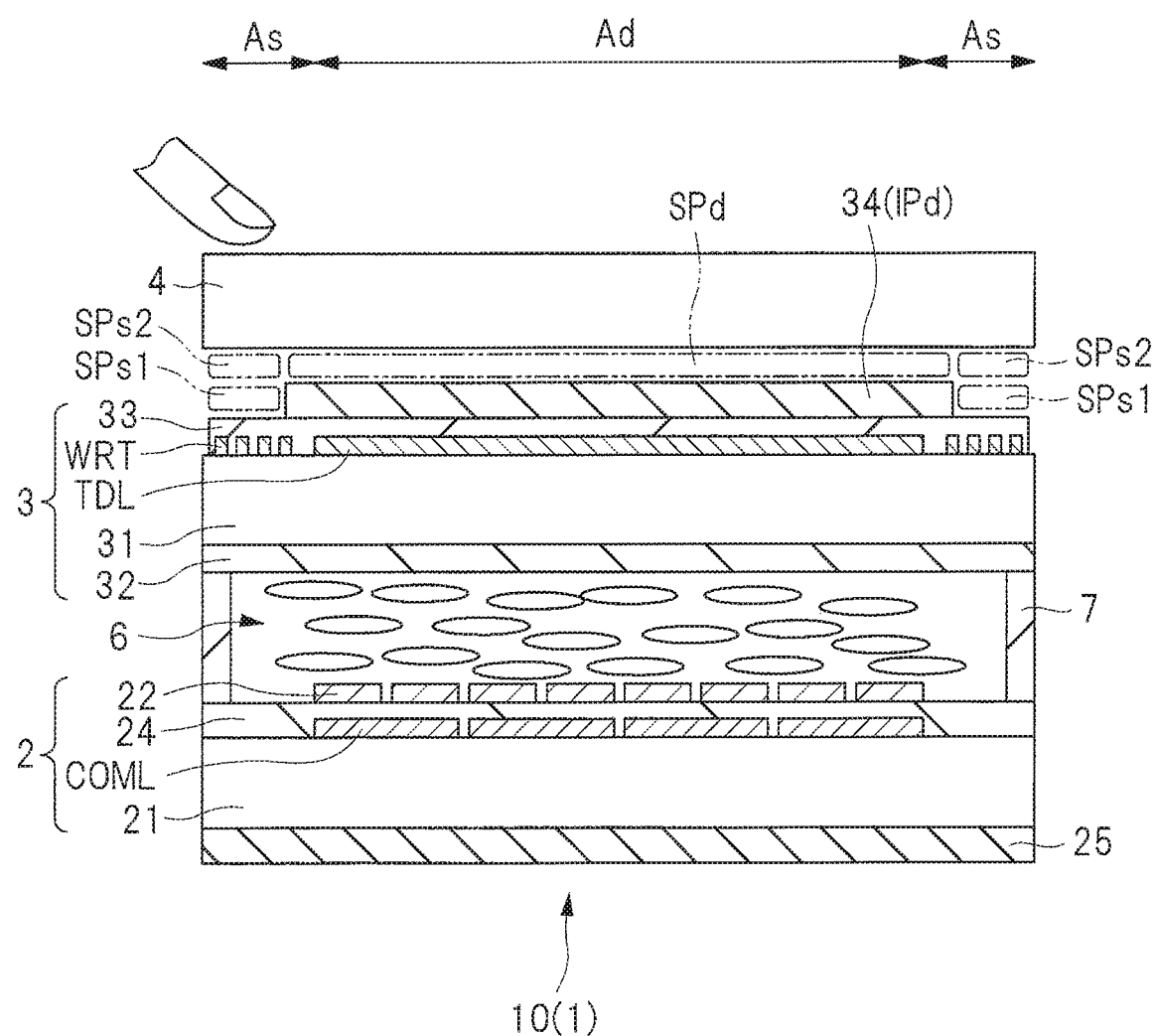
FIG. 10 is a cross-sectional view illustrating another configuration example of the display device with a touch sensing function in the display apparatus according to the first embodiment.

Next, arrangement of insulator parts on the protective film will be described with reference to FIG. 5, FIG. 6, FIG. 9 and FIG. 10. FIG. 9 and FIG. 10 are cross-sectional views illustrating other examples of the display device with a touch sensing function in the display apparatus according to the first embodiment.

As illustrated in FIG. 5, FIG. 6 and FIG. 9, an insulator part IPd is provided on the protective film 33 in the display region Ad. More specifically, the insulator part IPd is provided on the protective film 33 and is arranged so as to overlap the display region Ad when seen in a plan view. In other words, the insulator part IPd is provided on the upper surface of the substrate 31 via the protective film 33 and is arranged so as to overlap the display region Ad when seen in a plan view.

The insulator part IPd includes, for example, a polarization plate 34 and resin 35. The polarization plate 34 is provided on the upper surface of the substrate 31 via the protective film 33. The resin 35 is provided on the polarization plate 34. The cover plate 4 is provided on the resin 35 and is adhered to the polarization plate 34 by the resin 35. A structure of the polarization plate 34 will be described later in detail.

As illustrated in FIG. 6, spaces SPs1 are provided in the same layer as the insulator part IPd on the protective film 33 so as to overlap the lead wirings WRT of the sensing electrodes TDL in the peripheral region As when seen in a plan view. More specifically, the spaces SPs1 are provided at sides of the insulator part IPd and are arranged so as to overlap the lead wirings WRT in the peripheral region As when seen in a plan view. The permittivity of the space SPs1 is lower than the permittivity of the insulator part IPd. Therefore, as described later with reference to FIG. 11, when a finger or an input tool approaches the cover plate 4 in the peripheral region As, the electrostatic capacitance between the lead wirings WRT and the finger or input tool is relatively decreased.

Alternatively, as illustrated in FIG. 9, insulator parts IPs with a permittivity lower than the permittivity of the insulator part IPd may be provided in the same layer as the insulator part IPd on the protective film 33 so as to overlap the lead wirings WRT of the sensing electrodes TDL in the peripheral region As when seen in a plan view. More specifically, the insulator parts IPs may be provided at sides of the insulator part IPd and may be arranged so as to overlap the lead wirings WRT in the peripheral region As when seen in a plan view. Therefore, as described later with reference to FIG. 11, when a finger or an input tool approaches the cover plate 4 in the peripheral region As, the electrostatic capacitance between the lead wirings WRT and the finger or input tool is relatively decreased.

Note that the insulator part IPd may be provided on the entire display region Ad when seen in a plan view and may be provided from the entire display region Ad to the part of the peripheral region As when seen in a plan view. In such a case, since the polarization plate 34 included in the insulator part IPd can be provided on the entire display region Ad when seen in a plan view, the display device 10 with a touch sensing function that is a liquid crystal display apparatus can display an image on the entire display region Ad.

Also, as illustrated in FIG. 10, the insulator part IPd may include the polarization plate 34 and a space SPd may be provided between the polarization plate 34 and the cover plate 4. At this time, spaces SPs2 may be provided in the same layer as the space SPd above the protective film 33 in the peripheral region As when seen in a plan view. More specifically, the spaces SPs2 may be provided at sides of the space SPd and may be arranged so as to overlap the lead wirings WRT in the peripheral region As when seen in a plan view. The permittivity of the space SPs2 is equal to the permittivity of the space SPd, but the permittivity of the spaces SPs1 is lower than the permittivity of the insulator part IPd. Therefore, as described later with reference to FIG. 11, when a finger or an input tool approaches the cover plate 4 in the peripheral region As, the electrostatic capacitance between the lead wirings WRT and the finger or input tool is relatively decreased.

The case where the touch sensing device 30 of the self-capacitance method provided with only the sensing electrodes (see FIG. 8) is applied as the input device as described above will be considered. In such a case, the input device includes the substrate 31, the sensing electrodes TDL provided on the substrate 31, the lead wirings WRT provided on the substrate 31, the insulator part IPd provided on the upper surface of the substrate 31 and the insulator parts IPs or the spaces SPs1 provided at sides of the insulator part IPd. Also, in the input device, input positions are sensed by detecting the signals in accordance with the electrostatic capacitance of the sensing electrodes TDL through the lead wirings WRT.

<Noise Reduction in Peripheral Region>

Figure 11:
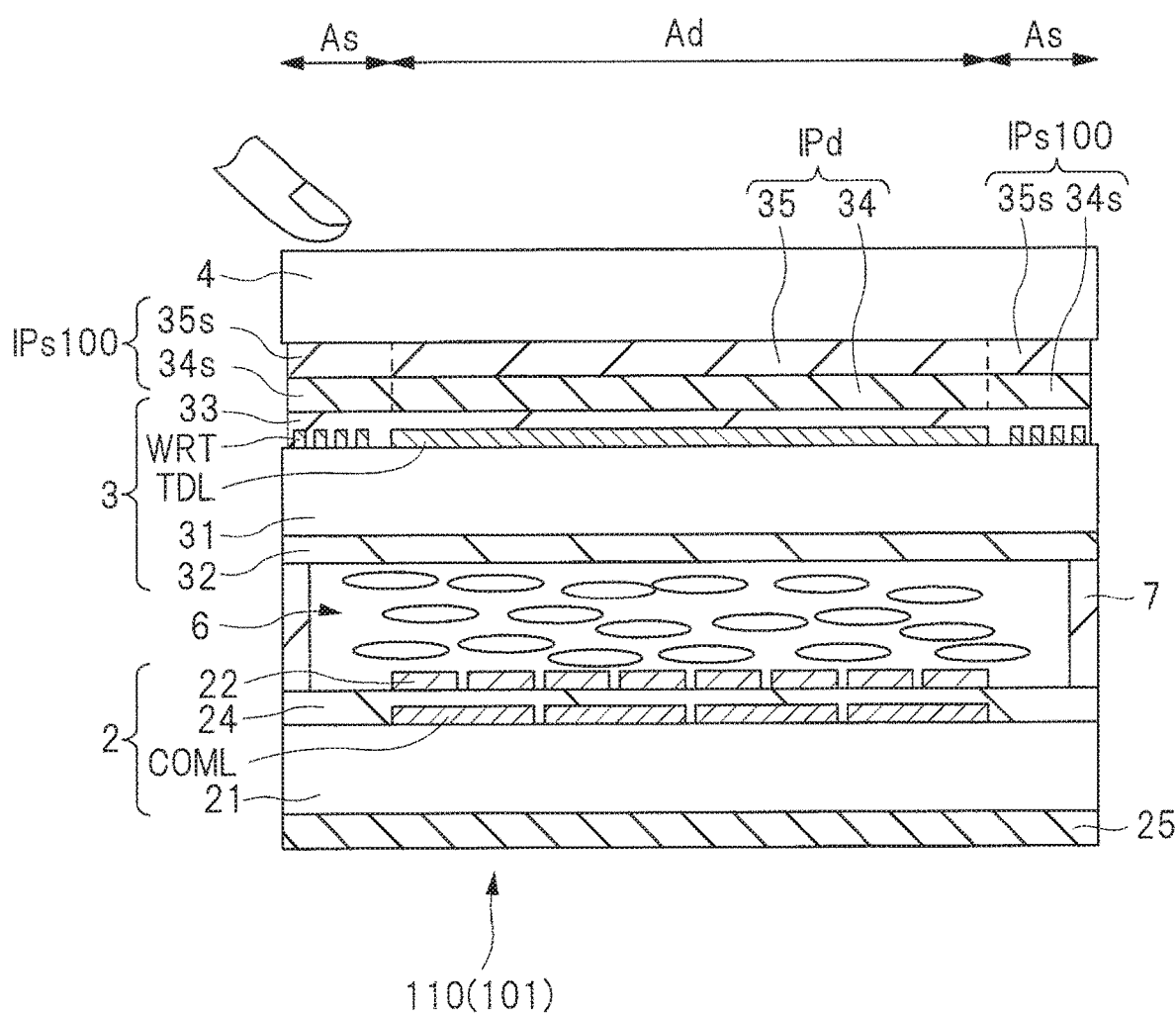
FIG. 11 is a cross-sectional view illustrating a display device with a touch sensing function in a display apparatus according to a comparative example 1.

Next, the noise reduction in the peripheral region in the display apparatus according to the first embodiment will be described in comparison with a display apparatus according to a comparative example 1. FIG. 11 is a cross-sectional view illustrating a display device with a touch sensing function in the display apparatus according to the comparative example 1.

Also in the display device 110 with a touch sensing function in the display apparatus 101 according to the comparative example 1, similarly to the display apparatus according to the first embodiment, the insulator part IPd is provided on the protective film 33 in the display region Ad when seen in a plan view. More specifically, the insulator part IPd is provided on the protective film 33 and is arranged so as to overlap the display region Ad when seen in a plan view. The insulator part IPd includes the polarization plate 34 provided on the protective film 33 and the resin 35 provided on the polarization plate 34.

However, in the display device 110 with a touch sensing function in the display apparatus 101 according to the comparative example 1, insulator parts IPs100 are formed in the same layer as the insulator part IPd on the protective film 33 so as to overlap the lead wirings WRT of the sensing electrodes TDL in the peripheral region As when seen in a plan view. The insulator part IPs100 includes a polarization plate 34s provided on the protective film 33 and resin 35s provided on the polarization plate 34s.

The polarization plate 34s is formed in the same layer as the polarization plate 34 and is made of the same kind of material as the polarization plate 34. The resin 35s is formed in the same layer as the resin 35 and is made of the same kind of material as the resin 35. More specifically, in the comparative example 1, the insulator part IPs100 is made of the same kind of material as the insulator part IPd, and the permittivity of the insulator part IPs100 is not lower than the permittivity of the insulator part IPd.

Thus, when a finger of an input tool approaches the cover plate 4 in the peripheral region As, electrostatic capacitance between the lead wirings WRT and the finger or input tool is relatively increased. Therefore, when a finger or an input tool approaches the cover plate 4 in the peripheral region As, noises from the finger or input tool are likely to be transmitted to the lead wirings WRT. Then, the signals detected through the lead wirings WRT from the sensing electrodes TOL are likely to be affected by the noises, so that a ratio of a signal intensity to a noise intensity, that is, an SN ratio decreases.

On the other hand, in the first embodiment, as illustrated in FIG. 9 or FIG. 6, the insulator parts IPs or the spaces SPs1 with the permittivity lower than the permittivity of the insulator part IPd are provided at sides of the insulator part IPd, and the insulator parts IPs or the spaces SPs1 are arranged so as to overlap the lead wirings WRT in the peripheral region As when seen in a plan view. Both of the permittivity of the insulator part IPs and the permittivity of the space SPs1 are lower than the permittivity of the insulator part IPd. Thus, when a finger or an input tool approaches the cover plate 4 in the peripheral region As, the electrostatic capacitance between the lead wirings WRT and the finger or input tool is relatively decreased. Therefore, when a finger or an input tool approaches the cover plate 4 in the peripheral region As, noises from the finger or input tool are less likely to be transmitted to the lead wirings WRT. Accordingly, the signals detected through the lead wirings WRT from the sensing electrodes TDL are less likely to be affected by the noises and the SN ratio increases, so that the sensing performance of the input device can be improved.

Further, in the first embodiment, the insulator part IPd with a relatively high permittivity is provided so as to overlap the display region Ad when seen in a plan view. Thus, when a finger or an input tool approaches the cover plate 4 in the display region Ad, electrostatic capacitance between the sensing electrodes TDL 110 and the finger or input tool is relatively increased. Therefore, the sensing performance of the input device can be improved.

The case where the lead wirings WRT include the extension parts EX1 and the connection parts CN1 and a ratio of the area of the connection parts CN1 to the area of the lead wirings WRT is smaller than a ratio of the area of the extension parts EX1 to the area of the lead wirings WRT as described above with reference to FIC. 5 will be considered. In such a case, the insulator parts IPs or the spaces SPs1 are preferably arranged so as to overlap at least the extension parts EX1 when seen in a plan view. In this manner, since the insulator parts IPs or the spaces SPs1 overlap the extension parts EX1 with a larger area ratio in the lead wirings WRT when seen in a plan view, when a finger or an input tool approaches the cover plate 4 in the peripheral region As, noises from the finger or input tool are less likely to be transmitted to the lead wirings WRT.

Also, the insulator parts IPs or the spaces SPs1 are preferably arranged so as to overlap both of the extension parts EX1 and the connection parts CN1 when seen in a plan view. In this manner, noises from a finger or an input tool are much less likely to be transmitted to the lead wirings WRT when the finger or input tool approaches the cover plate 4 in the peripheral region As in comparison with the case where the insulator parts IPs or the spaces SPs1 are arranged so as to overlap only the extension parts EX1 when seen in a plan view.

<Support Structure by Backlight Frame>

Figure 12:
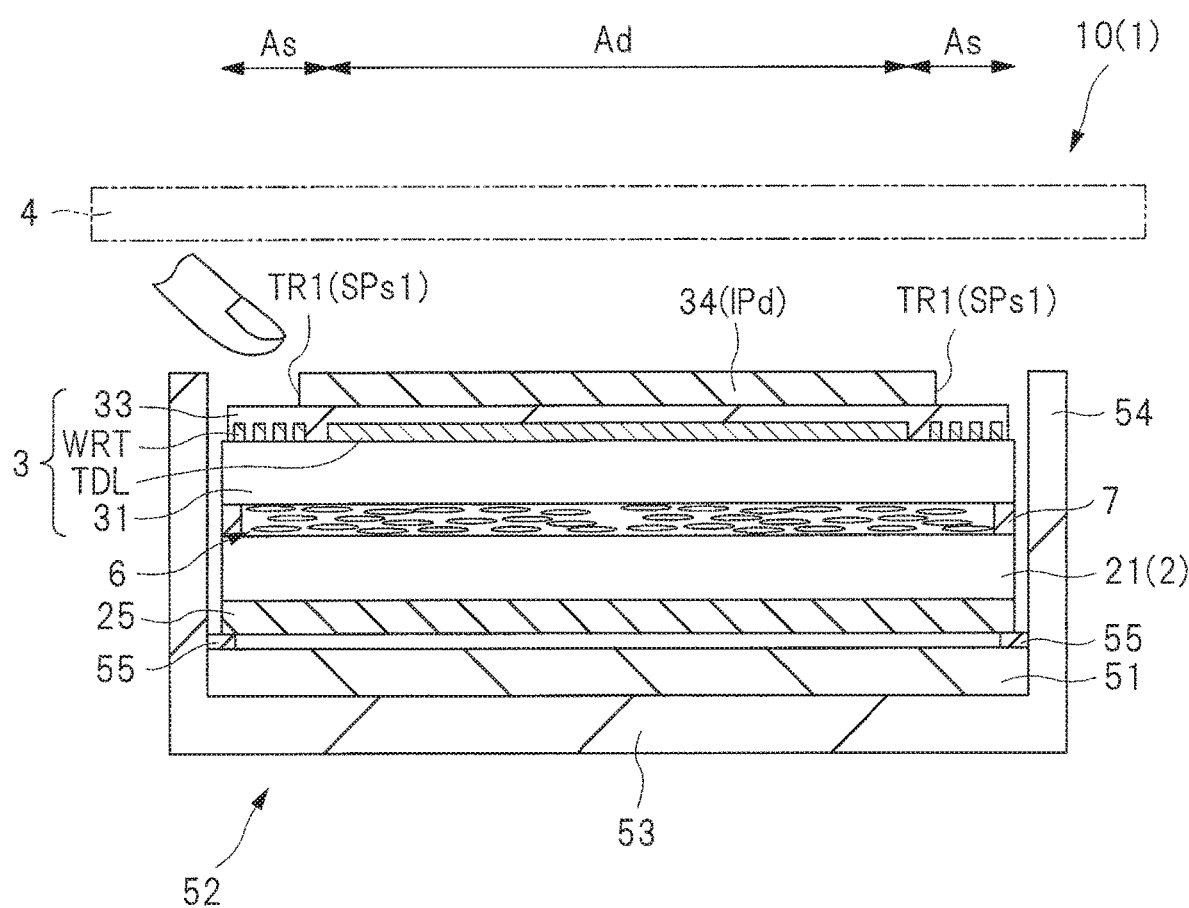
FIG. 12 is a cross-sectional view illustrating a support structure by a backlight frame of the display device with a touch sensing function in the display apparatus according to the first embodiment.
Figure 13:
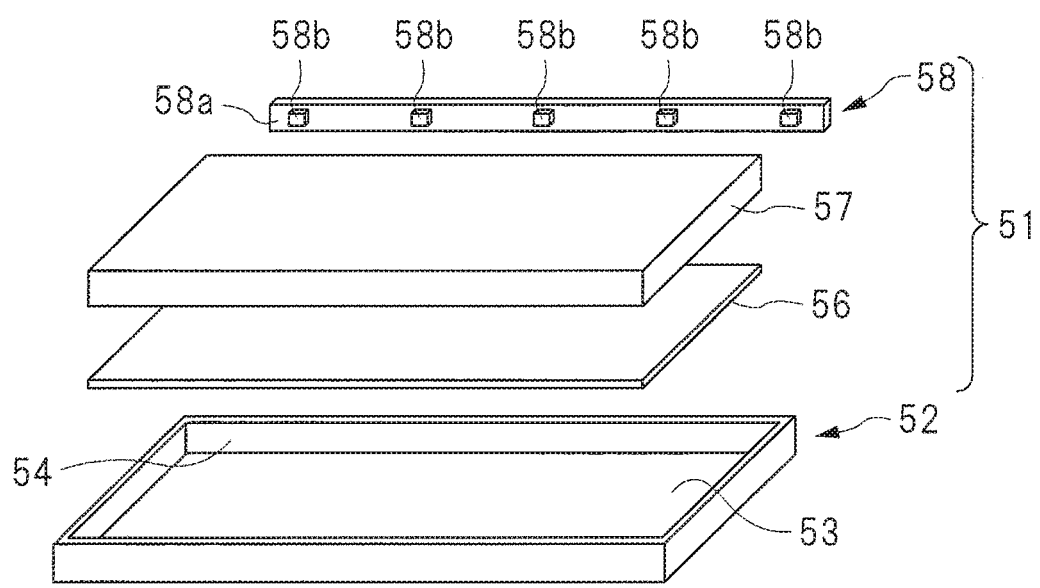
FIG. 13 is an exploded perspective view illustrating a structure of a backlight unit and the backlight frame.

Next, the support structure by a backlight frame will be described with reference to FIG. 12 and FIG. 13. FIG. 12 is a cross-sectional view illustrating the support structure by the backlight frame of the display device with a touch sensing function in the display apparatus according to the first embodiment. FIG. 13 is an exploded perspective view illustrating a structure of a backlight unit and the backlight frame. Note that illustrations of the driving electrodes COML, the insulating film 24, the pixel electrodes 22 and the color filter layer 32 are omitted in FIG. 12 for easy understanding. In addition, illustrations of adhesive tape 55 are omitted in FIG. 13.

In the example illustrated in FIG. 12, the display apparatus 1 includes the display device 10 with a touch sensing function, a backlight unit 51 and a backlight frame 52. The backlight frame 52 or a backlight bezel has a bottom part 53 and a frame part 54 provided on the outer periphery of the bottom part 53. The backlight unit 51 is provided on the bottom part 53 in the region surrounded by the frame part 54. Also, the display device 10 with a touch sensing function is provided on the backlight unit 51 via the adhesive tape 55 in the region surrounded by the frame part 54. Specifically, the polarization plate 25 of the display device 10 with a touch sensing function is provided above the backlight unit 51 via the adhesive tape 55.

As illustrated in FIG. 13, the backlight unit 51 includes a reflective plate 56, a light guide plate 57 and a light emitting diode (LED) unit 58. The light guide plate 57 is provided on the reflective plate 56 and the LED unit 58 is provided at a side of the light guide plate 57. The LED unit 58 includes a support member 58a and a plurality of LEDs 58b. The support member 58a is provided so as to face a side surface of the light guide plate 57, and the LEDs 58b are attached to the support member 58a so as to face the side surface of the light guide plate 57 and to be arrayed along the side surface of the light guide plate 57.

In the examples illustrated in FIG. 12 and FIG. 13, the light from the LED 58b is emitted from the entire upper surface of the light guide plate 57 by the light guide plate 57 and the reflective plate 56 and enters the polarization plate 25 in the display device 10 with a touch sensing function. The light which has entered the polarization plate 25 passes through the liquid crystal layer 6 in each of the sub-pixels SPix of the display device 10 with a touch sensing function, so that an image is displayed in the display region Ad when seen in a plan view.

As indicated by a two-dot chain line in FIG. 12, the cover plate 4 may not be provided. More specifically, the display apparatus 1 does not need to have the cover plate 4. The case where the cover plate 4 is not provided, the height position of the upper end of the frame part 54 of the backlight frame 52 is higher than the height position of the upper surface of the protective film 33, the spaces SPs1 are provided at sides of the insulator part IPd, and the spaces SPs1 are arranged so as to overlap the lead wirings WRT in the peripheral region As when seen in a plan view as illustrated in FIG. 12 will be considered. In such a case, the space SPs1 is a trench part TR1 provided between the insulator part IPd and the frame part 54 of the backlight frame 52.

Also in such a case, if a width of the trench part TR1 is so small that a finger or an input tool cannot enter the trench part TR1, when a finger or an input tool approaches the opposing substrate 3 in the peripheral region As, the finger or input tool cannot enter the trench part TR1. Therefore, electrostatic capacitance between the lead wirings WET and a finger or an input tool when the finger or input tool approaches the opposing substrate 3 in the peripheral region As is decreased in comparison with the case where the spaces SPs1 as the trench parts TR1 are not provided. Therefore, when a finger or an input tool approaches the opposing substrate 3 in the peripheral region As when seen in a plan view, noises from the finger or input tool are less likely to be transmitted to the lead wirings WRT, and signals output through the lead wirings WRT from the sensing electrodes TDL are less likely to be affected by the noises, so that a signal-to-noise ratio, that is, an SN ratio increases.

The cover plate 4 may be provided above the insulator part IPd formed of the polarization plate 34 in the display region Ad and above the trench parts TR1 in the peripheral region As. The cover plate 4 may be connected to the backlight frame 52 via, for example, a connection member (not illustrated). Further, as illustrated in FIG. 9, the insulator parts IPs may be provided at sides of the insulator part IPd in the peripheral region As instead of the spaces SPs1 as the trench parts TR1, and the cover plate 4 may be provided above the insulator parts IPs.

<Polarization Plate>

Figure 14:
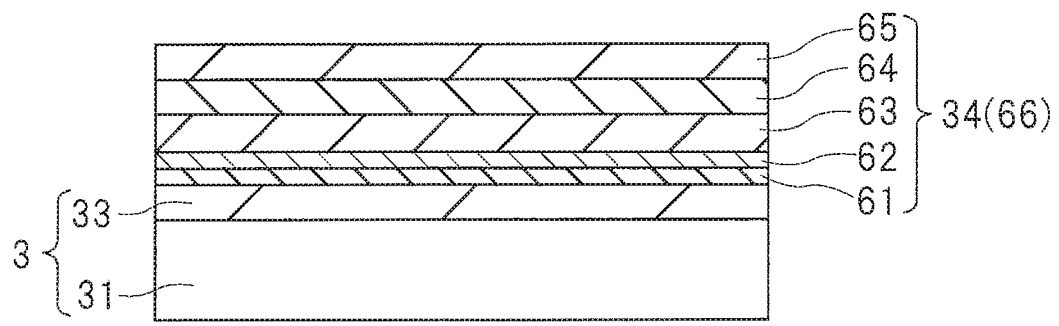
FIG. 14 is a cross-sectional view illustrating a configuration example of a polarization plate.

Next, the structure of the polarization plate will be described with reference to FIG. 14 to FIG. 16. FIG. 14 is a cross-sectional view illustrating a configuration example of the polarization plate. In the example illustrated in FIG. 14, the polarization plate 34 includes an adhesive layer 61, a conductive layer 62, a cover layer 63, a polarization layer 64 and a cover layer 65. In FIG. 14, the substrate 31 and the protective film 33 are illustrated in addition to the polarization plate 34 and illustrations of the sensing electrodes DL and the lead wirings WRT (see FIG. 6) are omitted.

The polarization layer 64 has a polarization function. The polarization layer 64 is made of an insulating film containing, for example, polyvinyl alcohol (PVA) as a main component and is formed by, for example, making the PVA serving as a main component absorb and align molecules of compound containing iodine.

On a surface of the polarization layer 64 on a side opposite to the protective film 33, the cover layer 65 is formed so as to cover the surface of the polarization layer 64 on the side opposite to the protective film 33. The cover layer 65 contains, for example, triacetylcellulose (TAO) as a main component. Though not illustrated, a hard coat layer may be formed on the cover layer 65. Further, on a surface of the polarization layer 64 on a side close to the protective film 33, the cover layer 63 is formed so as to cover the surface of the polarization layer 64 on the side close to the protective film 33. The cover layer 63 contains, for example, TAC as a main component like the cover layer 65.

On a surface of the cover layer 63 on a side close to the protective film 33, the conductive layer 62 is formed. The conductive layer 62 is a translucent and conductive layer, and is made of, for example, indium tin oxide (ITO), indium zinc oxide (IZO), tin oxide (SnO) or an organic conductive film. The conductive layer 62 suppresses the disturbance of display due to externally-applied static electricity transmitted to the liquid crystal layer 6 or suppresses the deterioration of the sensitivity in touch sensing.

On a surface of the conductive layer 62 on a side close to the protective film 33, the adhesive layer 61 is formed. The adhesive layer 61 adheres the conductive layer 62 in the polarization plate 34 to the protective film 33.

In this manner, the polarization plate 34 includes a laminated film 66 in which a plurality of layers including the polarization layer 64 formed of an insulating film and the conductive layer 62 with a conductive property are laminated in any order. When the polarization plate 34 includes the conductive layer 62, capacitance between the sensing electrodes TDL and a finger or an input tool increases by the thickness of the conductive layer 62 in comparison with the case where the polarization plate 34 includes another insulating film. Therefore, when a finger or an input tool approaches the cover plate 4 in the peripheral region As, noises from the finger or input tool are likely to be transmitted to the sensing electrodes TDL, and signals output from the sensing electrodes TDL are more likely to be affected by noises, so that a signal-to-noise ratio, that is, an SN ratio decreases.

Meanwhile, when the polarization plate 34 includes the conductive layer 62, influence of noises is likely to reach the positions far away from the position which a finger or an input tool approaches in the plane of the substrate 31 in comparison with the case where the polarization plate 34 does not include the conductive layer 62 and is formed of only an insulating film. In such a case, when the polarization plate 34 is arranged also in the peripheral region As when seen in a plan view, influence of noises generated in the peripheral region As reaches the display region Ad.

As described above, when the polarization plate 34 includes the conductive layer 62, by providing the insulator parts IPs or the spaces SPs1 with a permittivity lower than the permittivity of the insulator part IPd at sides of the insulator part IPd, the effect that noises are less likely to be generated in the peripheral region As can be increased. Therefore, when a finger or an input tool approaches the cover plate 4 in the peripheral region As, noises from the finger or input tool are much less likely to be transmitted to the sensing electrodes TDL, and signals detected by the input device are less likely to be affected by noises, so that the SN ratio can further increase.

More specifically, when the insulator parts IPs with a permittivity lower than the permittivity of the insulator part IPd are provided at sides of the insulator part IPd in the peripheral region As as illustrated in FIG. 9 and the polarization plate 34 includes the conductive layer 62, it is preferable that the insulator parts IPs do not include the polarization plate 34, that is, a conductive layer. In this manner, it is possible to prevent or suppress influence of noises in the display region Ad from reaching the peripheral region As.

Note that, when the insulator part is formed of a laminated film in which a plurality of insulating layers and a plurality of conductive layers are laminated, a permittivity of the insulator part means an average permittivity defined based on a total electrostatic capacitance which is a serial sum of electrostatic capacitances of the plurality of insulating layers.

Figure 15:
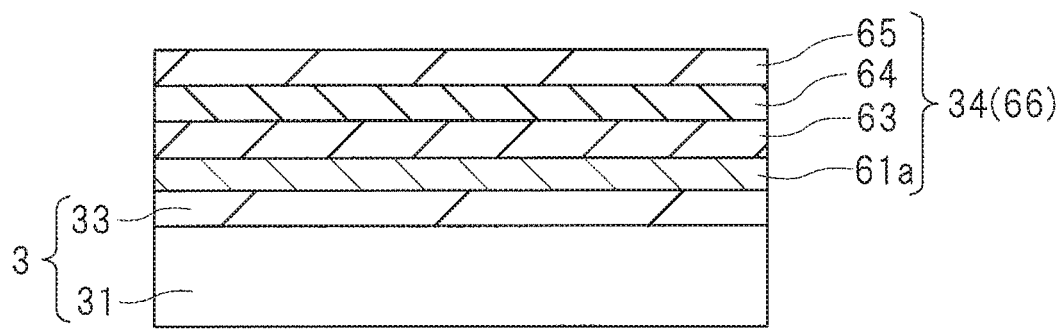
FIG. 15 is a cross-sectional view illustrating another configuration example of a polarization plate.
Figure 16:
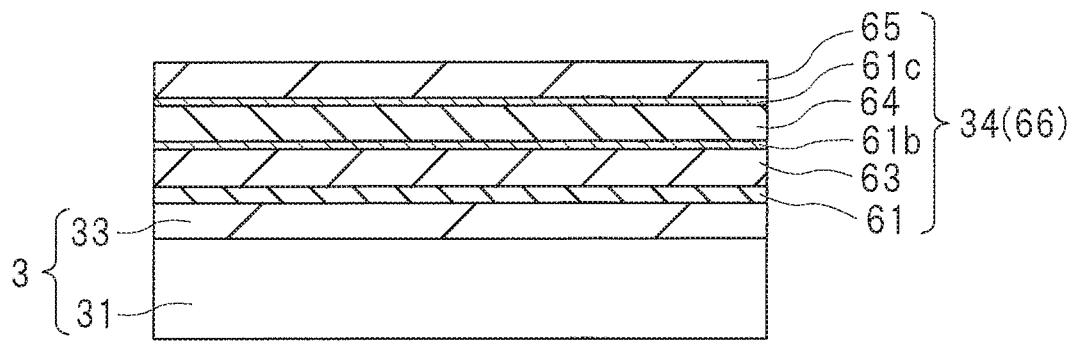
FIG. 16 is a cross-sectional view illustrating another configuration example of a polarization plate.

FIG. 15 and FIG. 16 are cross-sectional views illustrating other configuration examples of the polarization plate. In the example illustrated in FIG. 15, the conductive layer 62 (see FIG. 14) is not formed, and the cover layer 63 and an adhesive layer 61a are in contact with each other. In the example illustrated in FIG. 15, the adhesive layer 61a contains conductive particles and thus the adhesive layer 61a is used as a conductive layer. On the other hand, in the example illustrated in FIG. 16, a conductive adhesive layer 61b is formed between the polarization layer 64 and the cover layer 63 and a conductive adhesive layer 61c is formed between the polarization layer 64 and the cover layer 65. In this manner, the adhesive layers 61b and 61c are used as conductive layers.

At this time, the polarization plate 34 illustrated in FIG. 15 also includes the laminated film 66 in which a plurality of layers including the polarization layer 64 formed of an insulating film and the adhesive layer 61a as a conductive layer with a conductive property are laminated in any order like the polarization plate 34 illustrated in FIG. 14. Further, the polarization plate 34 illustrated in FIG. 16 also includes the laminated film 66 in which a plurality of layers including the polarization layer 64 formed of an insulating film and the adhesive layers 61b and 61c as conductive layers with a conductive property are laminated in any order like the polarization plate 34 illustrated in FIG. 14. Therefore, by providing the insulator parts IPs or the spaces SPs1 with a permittivity lower than the permittivity of the insulator part IPd at sides of the insulator part IPd, the effect that noises are less likely to be generated in the peripheral region As can be increased.

<Material of Protective Film>

Figure 17:
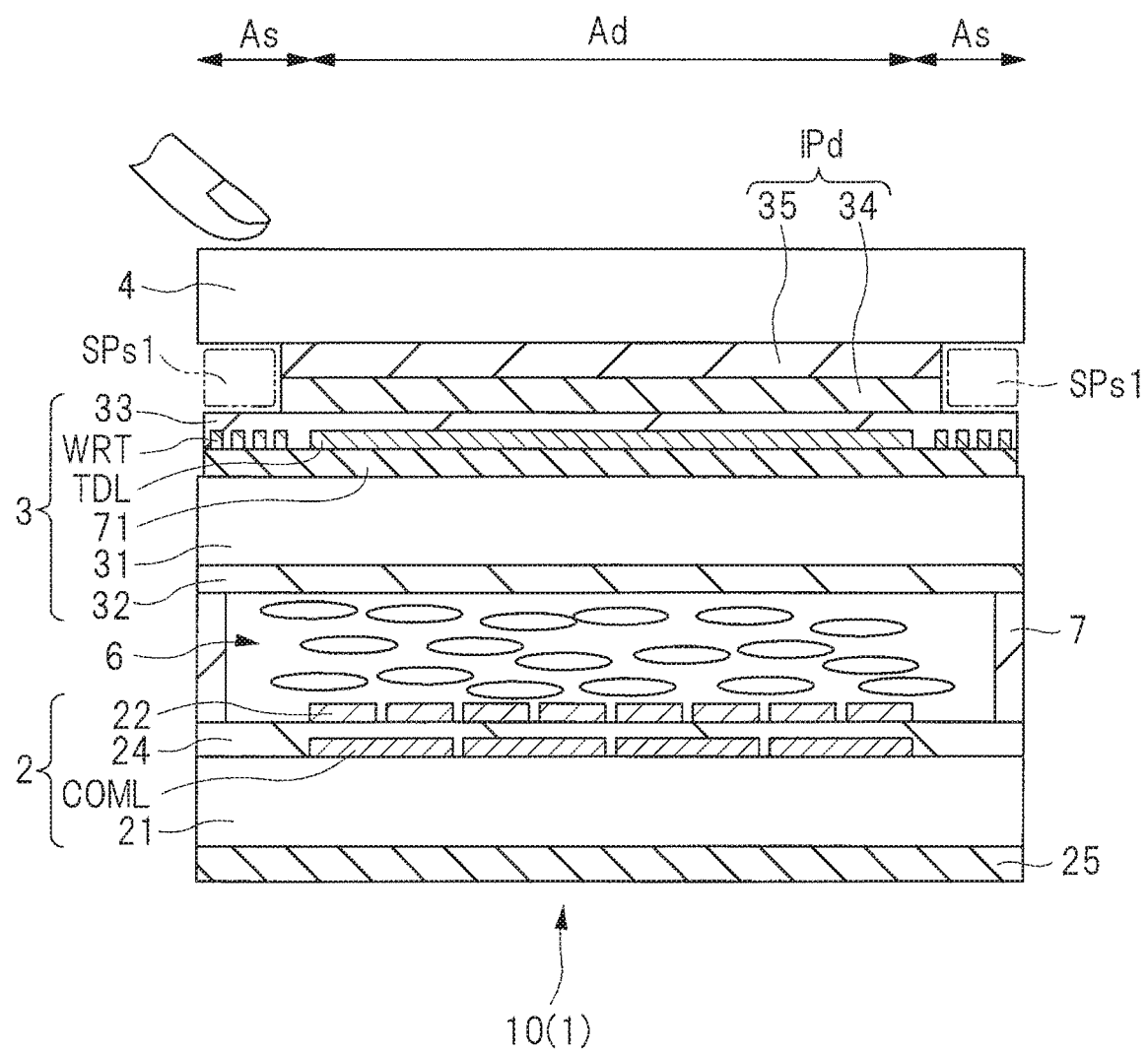
FIG. 17 is a cross-sectional view illustrating another example of the display device with a touch sensing function in the display apparatus according to the first embodiment.
Figure 18:
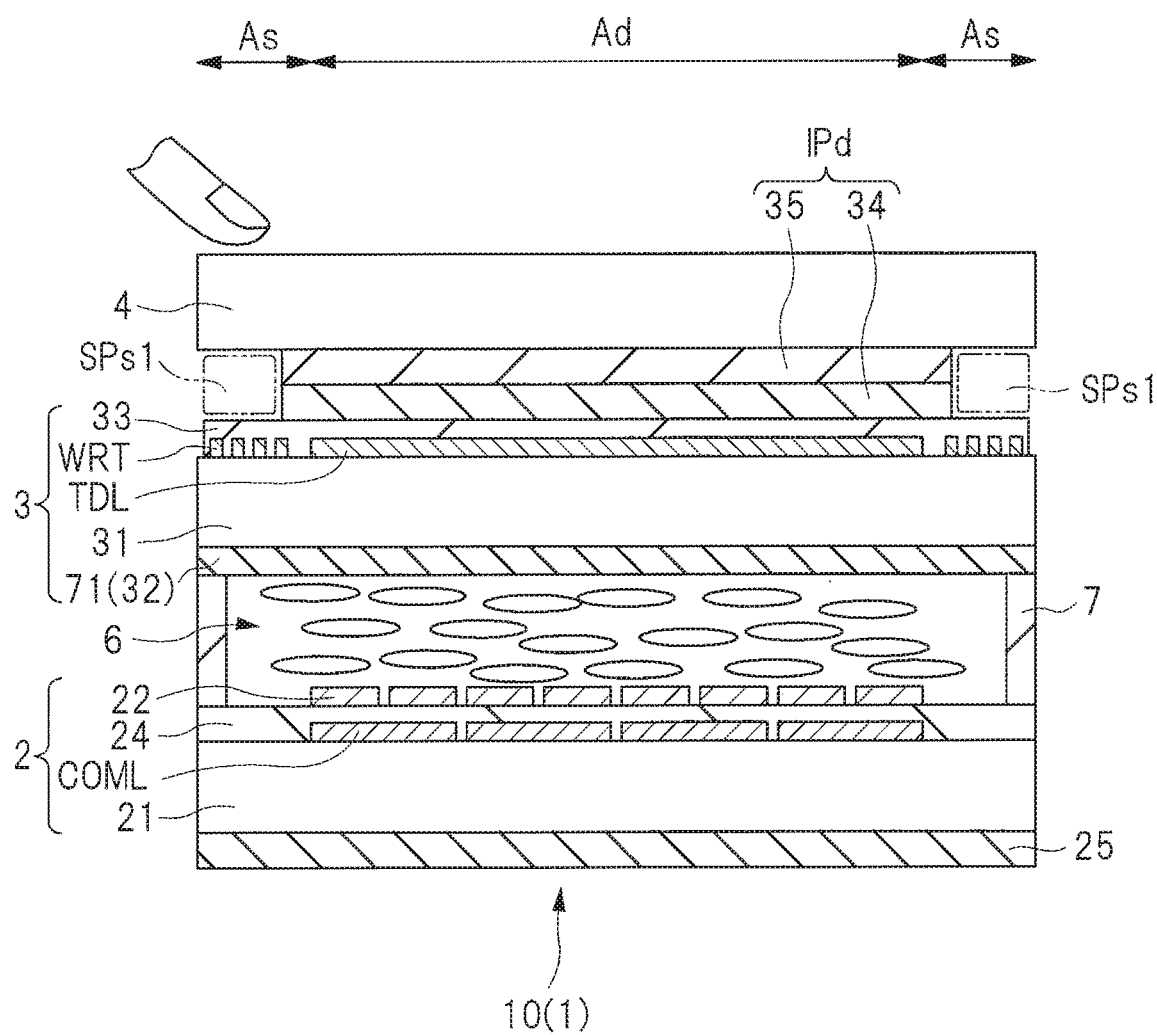
FIG. 18 is a cross-sectional view illustrating another example of the display device with a touch sensing function in the display apparatus according to the first embodiment.

Next, a material of the protective film will be described below with reference to FIG. 17 and FIG. 18. FIG. 17 and FIG. 18 are cross-sectional views illustrating other examples of the display device with a touch sensing function in the display apparatus according to the first embodiment.

Preferably, the protective film 33 is made of an ultraviolet (UV) curable material. In this case, by applying a material of the protective film 33 to form an applied film and then irradiating the applied film thus formed with a light including an ultraviolet ray to cure the applied film, the protective film can be formed. Therefore, since a thermal processing does not need to be performed for forming the protective film 33, it is possible to prevent or suppress each component in the display device with a touch sensing function such as the liquid crystal layer 6 from being deteriorated by the thermal processing.

Also, when the protective film 33 is made of an ultraviolet curable material, the display device 10 with a touch sensing function includes an ultraviolet ray absorption layer 71 for absorbing an ultraviolet ray. Then, the ultraviolet ray absorption layer 71 is preferably provided on a side opposite to the array substrate 2 with the liquid crystal layer 6 interposed therebetween, that is, between the liquid crystal layer 6 and the protective film 33.

There is a fear that liquid crystal molecules forming the liquid crystal layer 6 are decomposed and modified when irradiated with an ultraviolet ray. Also, there is a fear that an alignment film (not illustrated) arranged on a side of the array substrate 2 or the opposing substrate 3 with the liquid crystal layer 6 interposed therebetween is also decomposed and modified when irradiated with an ultraviolet ray. Thus, by providing the ultraviolet ray absorption layer 71 on a side opposite to the array substrate 2 with the liquid crystal layer 6 interposed therebetween, that is, between the liquid crystal layer 6 and the protective film 33, the ultraviolet ray emitted in forming the protective film 33 is absorbed in the ultraviolet ray absorption layer 71, so that it is possible to prevent or suppress the ultraviolet ray from reaching the liquid crystal layer 6 or the alignment film (not illustrated). Therefore, it is possible to prevent or suppress the liquid crystal layer 6 or the alignment film (not illustrated) from being irradiated with an ultraviolet ray and being decomposed and modified.

As the ultraviolet ray absorption layer 71 like this, a transparent film made of an inorganic material such as titanium oxide ($TiO_2$) or zinc oxide (ZnO) or a transparent film made of an organic material such as benzotriazole can be used.

In the specification of this application, the expression "transparent" in the transparent film means that transmittance with respect to the visible light is, for example, 80% or more.

Also, as the light source for emitting a light made of ultraviolet ray, a LED lamp for emitting a light with a single wavelength or a light with a single wavelength and a wavelength in a wavelength range around the single wavelength is preferably used. Alternatively, as the light source for emitting a light made of ultraviolet ray, a light source for emitting a light with a wavelength in a long-wavelength range or a light from which a light with a wavelength in a short-wavelength range is removed by, for example, a filter is preferably used.

In the example illustrated in FIG. 17, the ultraviolet ray absorption layer 71 is provided on the upper surface serving as one main surface of the substrate 31 and the protective film 33 is provided on the ultraviolet ray absorption layer 71. More specifically, the ultraviolet ray absorption layer 71 is arranged immediately below the protective film 33. In the example illustrated in FIG. 17, the ultraviolet ray absorption layer 71 may be provided with a function of improving an adhesiveness of the protective film 33 to the substrate 31.

In the example illustrated in FIG. 18, the ultraviolet ray absorption layer 71 is provided on the lower surface serving as the other main surface of the substrate 31. In the example illustrated in FIG. 18, the ultraviolet ray absorption layer 71 serves also as the color filter layer 32, but is preferably provided so as to cover the entire region in which the liquid crystal layer 6 is arranged when seen in a plan view. Further, though not illustrated, the ultraviolet ray absorption layer 71 may be provided between the substrate 31 and the color filter layer 32, or may be provided separately from the color filter layer 32 on a side opposite to the substrate 31 with the color filter 32 interposed therebetween on the side closer to the substrate 31 relative to the alignment film (not illustrated).

Alternatively, the protective film 33 is made of a thermosetting material. In this case, by applying a material of the protective film 33 to form an applied film and then performing a thermal processing to the applied film thus formed to cure the applied film, the protective film 33 can be formed. Therefore, since a protective film made of an ultraviolet curable material does not need to be formed, the material cost can be reduced.

It is preferable that an insulation property of the protective film 33 is high. A sheet resistance of the protective film 33 is preferably $1\times10^9$ Ω/square or more. When the sheet resistance of the protective film 33 is less than $1\times10^9$ Ω/square, there is a fear that the sensing electrodes TDL covered with the protective film 33 are short-circuited. On the other hand, when the sheet resistance of the protective film 33 is $1\times10^9$ Ω/square or more, it is possible to prevent or suppress the sensing electrodes TDL covered with the protective film 33 from being short-circuited, and the sensing performance of the input device can be improved.

<Adhesive Force of Polarization Plate to Protective Film>

Next, an adhesive force of the polarization plate 34 to the protective film 33 will be described.

Preferably, an adhesive force of the protective film 33 to the substrate 31 is larger than an adhesive force of the polarization plate 34 to the protective film 33. Thus, when the protective film 33 is formed on the substrate 31 and then the polarization plate 34 is adhered to the protective film 33 by the use of, for example, the adhesive layer 61 (see FIG. 14), even if the position of the polarization plate 34 is dislocated from a desired position, the polarization plate 34 can be released from the protective film 33 and can be adhered again. Thus, the spaces SPs1 (see FIG. 6) or the like can be provided at sides of the insulator part IPd including the polarization plate 34 with an excellent positional accuracy. Therefore, when a finger or an input tool approaches the cover plate 4 in the peripheral region As (see FIG. 6), electrostatic capacitance between the lead wirings WRT and the finger or input tool can be relatively decreased.

Figure 19:
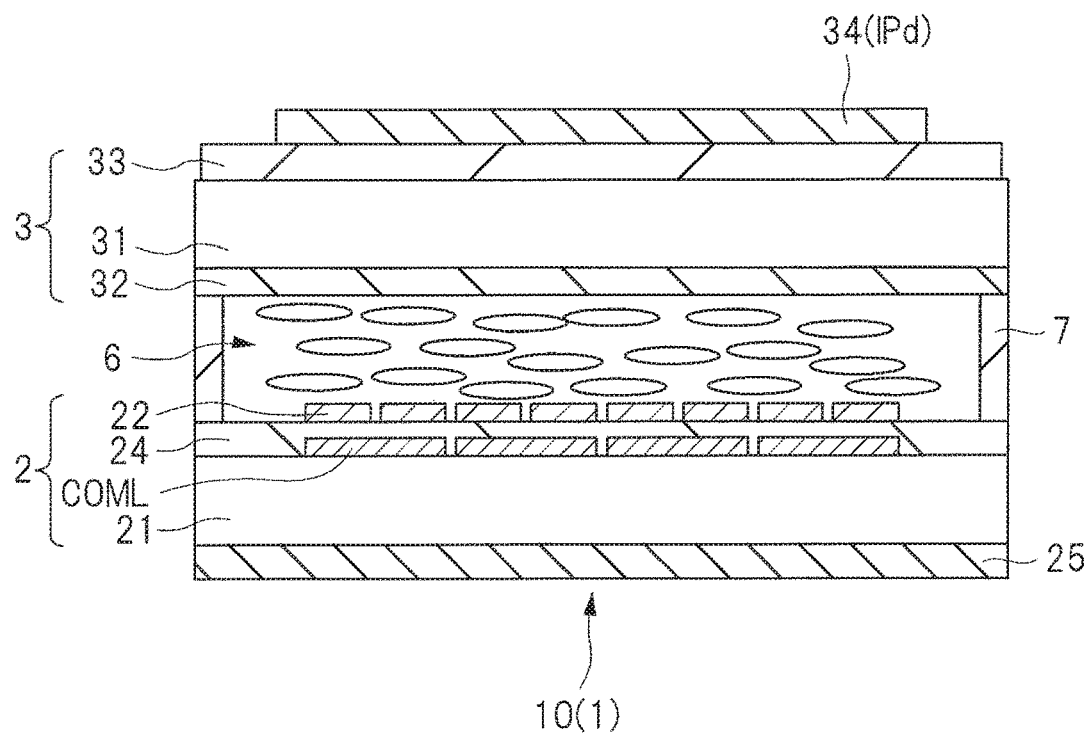
FIG. 19 is a diagram for describing a method for measuring a magnitude of an adhesive force of a polarization plate to a protective film.
Figure 20:
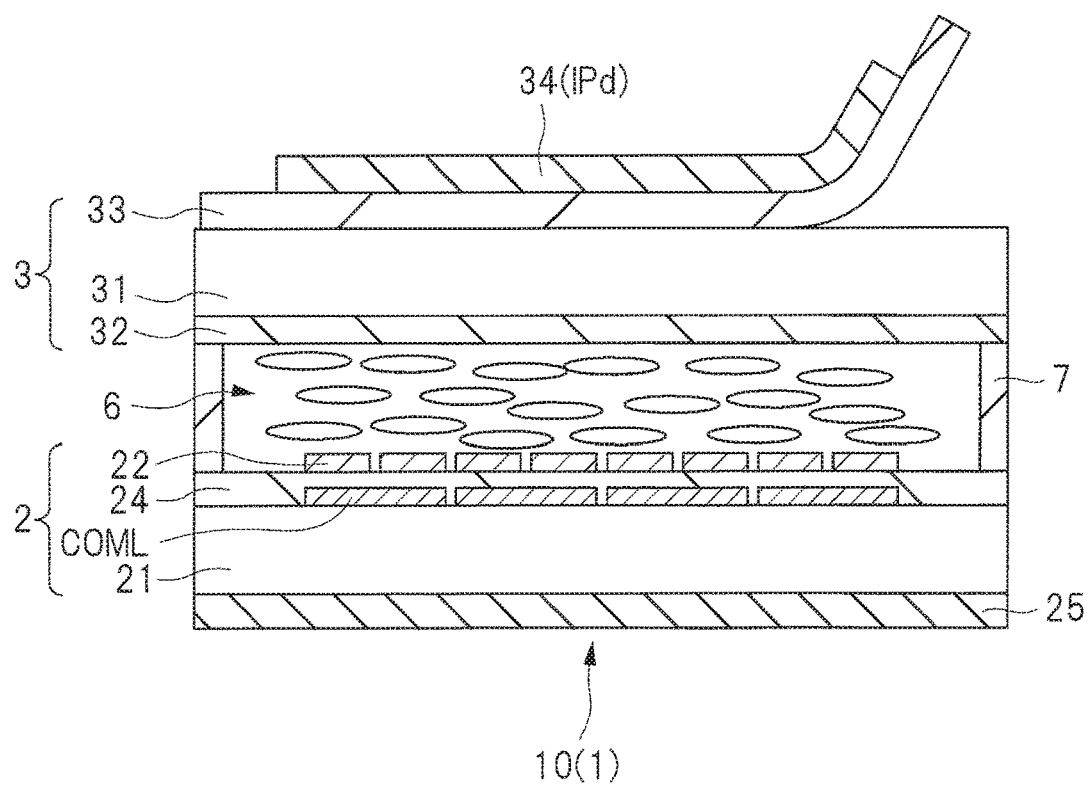
FIG. 20 is a diagram for describing the method for measuring a magnitude of an adhesive force of a polarization plate to a protective film.
Figure 21:
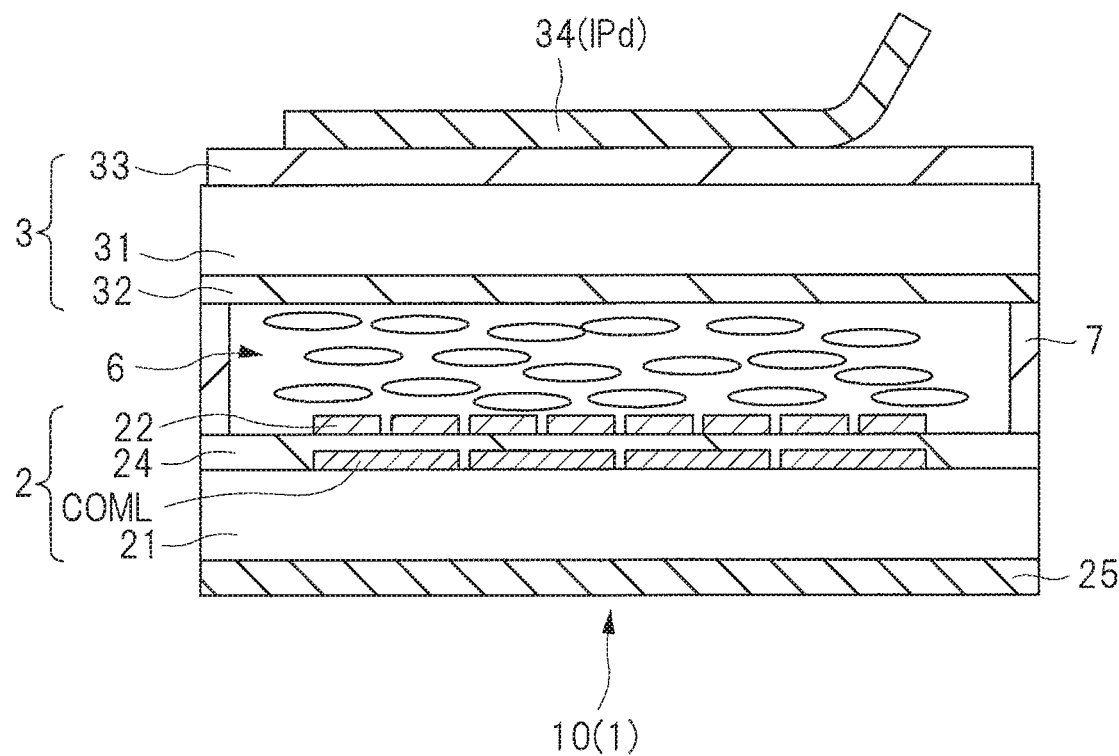
FIG. 21 is a diagram for describing the method for measuring a magnitude of an adhesive force of a polarization plate to a protective film.

A magnitude of the adhesive force of the polarization plate 34 to the protective film 33 can be measured by, for example, an adhesive tape test method for measuring a strength in releasing the polarization plate 34 from the protective film 33 by an adhesive tape. FIG. 19 to FIG. 21 are diagrams for describing the method for measuring a magnitude of an adhesive force of the polarization plate to the protective film.

First, in the state where the array substrate 2 and the opposing substrate 3 are arranged in opposition to each other, the liquid crystal layer 6 is supplied between the array substrate 2 and the opposing substrate 3 and the liquid crystal layer 6 is sealed by the sealing part 7, and the protective film 33 is formed on the substrate 31 and the polarization plate 34 is adhered onto the protective film 33, thereby preparing a structure illustrated in FIG. 19. Next, an adhesive tape (not illustrated) is adhered onto one end of the polarization plate 34 and the adhered adhesive tape is then pulled to release the polarization plate 34 from the protective film 33.

For example, as illustrated in FIG. 20, if the protective film 33 is released together with the polarization plate 34 in releasing the polarization plate 34, the adhesive force of the protective film 33 to the substrate 31 is smaller than the adhesive force of the polarization plate 34 to the protective film 33. In such a case, when the protective film 33 is formed on the substrate 31 and then the polarization plate 34 is adhered onto the protective film 33, if the position of the polarization plate 34 is dislocated from a desired position when seen in a plan view, the polarization plate 34 cannot be released from the protective film 33 and cannot be adhered again.

On the other hand, as illustrated in FIG. 21, if the protective film 33 is not released and only the polarization plate 34 is released in releasing the polarization plate 34, the adhesive force of the protective film 33 to the substrate 31 is larger than the adhesive force of the polarization plate 34 to the protective film 33. In such a case, when the protective film 33 is formed on the substrate 31 and then the polarization plate 34 is adhered onto the protective film 33, even if the position of the polarization plate 34 is dislocated from a desired position when seen in a plan view, the polarization plate 34 can be released from the protective film 33 and can be adhered again.

<Main Characteristic and Effect of Present Embodiment>

In the display apparatus according to the first embodiment, the insulator parts IPs or the spaces SPs1 are provided at sides of the insulator part IPd and are arranged so as to overlap the lead wirings WRT in the peripheral region As when seen in a plan view. Both of the permittivity of the insulator part IPs and the permittivity of the space SPs1 are lower than the permittivity of the insulator part IPd. Therefore, when a finger or an input tool approaches the cover plate 4 in the peripheral region As, electrostatic capacitance between the lead wirings WRT and the finger or input tool is relatively decreased. Therefore, when a finger or an input tool approaches the cover plate 4 in the peripheral region As, noises from the finger or input tool are less likely to be transmitted to the lead wirings WRT, and signals detected by the input device are less likely to be affected by the noises, so that the SN ratio increases.

In the first embodiment, the driving electrodes COML extend along the signal lines SGL and the sensing electrodes TDL extend along the scanning lines GCL. Also, the terminal parts TM are provided on one side of the display region Ad in the direction in which the signal lines SGL extend, and the terminal parts TM and the sensing electrodes TDL are electrically connected to each other via the lead wirings WRT. In such a case, when a metallic material is used as a material of the sensing electrodes TDL, a ratio of the region in which the lead wirings WRT are provided relative to the peripheral region As increases. Thus, the effect of the first embodiment described above, that is, the effect that when a finger or an input tool approaches the cover plate 4 in the peripheral region As, noises from the finger or input tool are less likely to be transmitted to the lead wirings WRT and signals detected by the input device are less likely to be affected by the noises, so that the SN ratio increases is particularly increased.

In the first embodiment, the case in which the sensing electrodes TDL, the lead wirings WRT and the protective film 33 are formed on the upper surface of the substrate 31 has been described. However, the display device 10 with a touch sensing function in the display apparatus 1 according to the first embodiment is applicable also to the case where the sensing electrodes TDL, the lead wirings WRT and the protective film 33 are formed on the lower surface of the substrate 31 or the upper surface or lower surface of the substrate 21. Also in such a case, by providing the insulator parts IPs or the spaces SPs1 with a permittivity lower than the permittivity of the insulator part IPd at sides of the insulator part IPd, noises from a finger or an input tool are less likely to be transmitted to the lead wirings WRT.

Furthermore, in the first embodiment, the example in which the display apparatus including a touch panel as an input device is applied to an in-cell liquid crystal display apparatus with a touch sensing function in which the driving electrodes COML for the display apparatus serve also as the driving electrodes for the input device has been described. Meanwhile, it is also possible to apply the display apparatus including a touch panel as an input device to the in-cell liquid crystal display apparatus with a touch sensing function in which the driving electrodes COML for the display apparatus and the driving electrodes for the input device are separately formed (the same is true of the second embodiment). Alternatively, it is also possible to apply the display apparatus including a touch panel as an input device to an on-cell type display apparatus in which an input device is separately provided for various types of display apparatuses (the same is true of the second embodiment).

Second Embodiment

In the first embodiment, the driving electrodes extend along the signal lines and the sensing electrodes extend along the scanning lines when seen in a plan view. Meanwhile, in the second embodiment, the driving electrodes extend along the scanning lines and the sensing electrodes extend along the signal lines.

An entire configuration of the display apparatus according to the second embodiment can be the same as the entire configuration of the display apparatus according to the first embodiment, and the description thereof will be omitted.

<Module>

Figure 22:
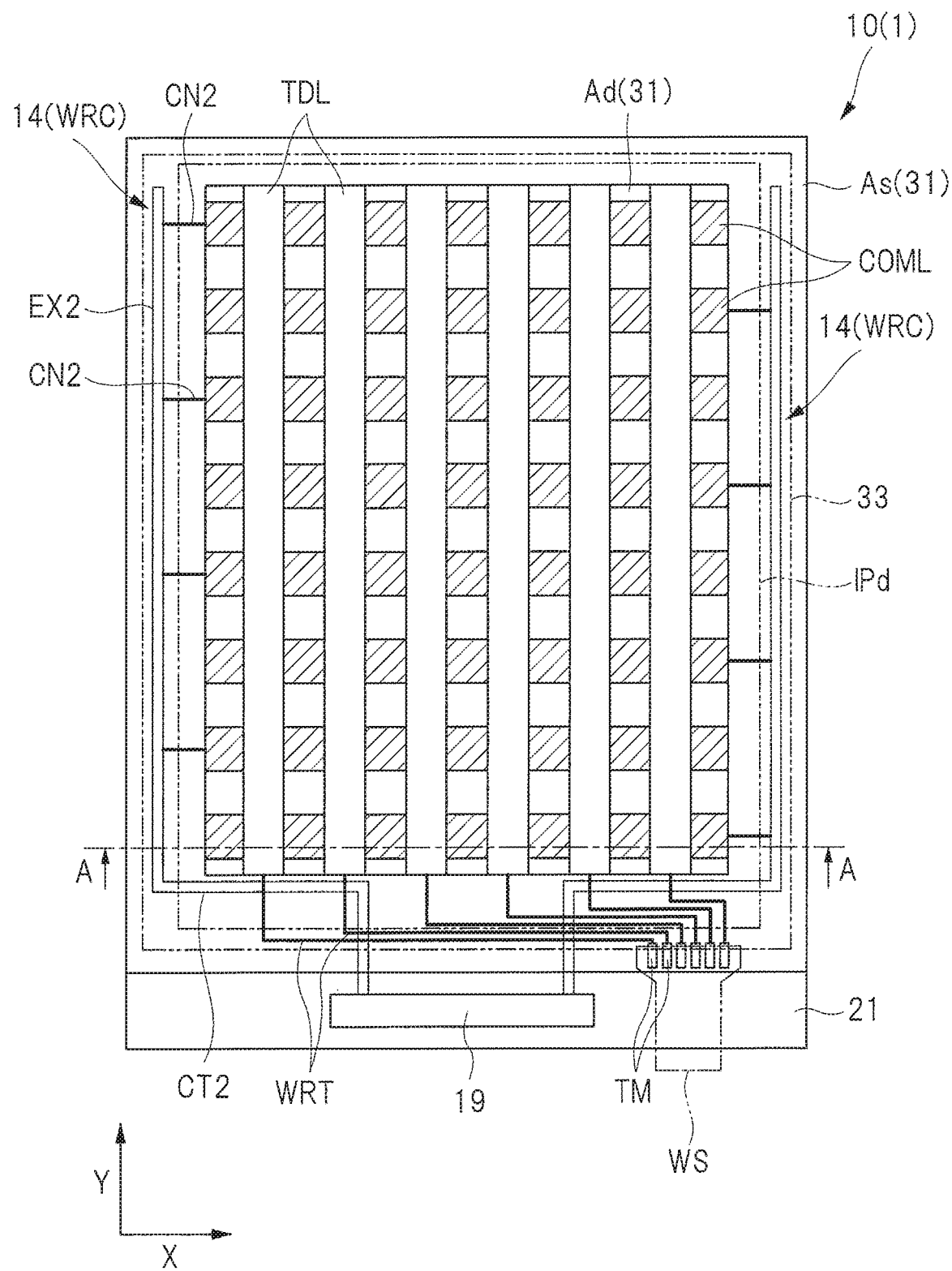
FIG. 22 is a plan view illustrating an example of a module having the display apparatus according to the second embodiment incorporated therein.

FIG. 22 is a plan view illustrating an example of a module having the display apparatus according to the second embodiment incorporated therein. As illustrated in FIG. 22, the display device 10 with a touch sensing function according to the second embodiment has a substrate 21, a substrate 31, a plurality of driving electrodes COML and a plurality of sensing electrodes TDL similarly to the display device 10 with a touch sensing function according to the first embodiment. The substrate 31 has an upper surface serving as one main surface and a lower surface serving as the other main surface. Here, two directions which mutually intersect, preferably orthogonally, with each other within the upper surface of the substrate 31 or the lower surface of the substrate 31 are defined to be an X axis direction and a Y axis direction. At this time, the plurality of driving electrodes COML respectively extend in the X axis direction and are arrayed in the Y axis direction when seen in a plan view. Further, the plurality of sensing electrodes TDL respectively extend in the Y axis direction and are arrayed in the X axis direction when seen in a plan view.

As will be described later with reference to FIG. 24, each of the plurality of driving electrodes COML is provided so as to overlap the plurality of sub-pixels SPix arrayed in the X axis direction when seen in a plan view. More specifically, one driving electrode COML is provided as a common electrode for the plurality of sub-pixels SPix.

Also in the example illustrated in FIG. 22, similarly to the first embodiment, the terminal parts TM are provided on one side of the display device 10 with a touch sensing function in the Y axis direction. The terminal parts TM and the sensing electrodes TDL are electrically connected to each other by the lead wirings WRT, respectively. The terminal parts TM are electrically connected to the wiring substrate WS and the wiring substrate WS is connected to the touch sensing unit 40 (see FIG. 1) mounted on the outside of the module. Therefore, the sensing electrodes TDL are connected to the touch sensing unit 40 via the lead wirings WRT, the terminal parts TM and the wiring substrate WS.

The display device 10 with a touch sensing function includes the driving electrode driver 14 and the COG 19. The COG 19 is a chip mounted on the substrate 21 and it incorporates respective circuits required for the display operation such as the control unit 11, the gate driver 12 and the source driver 13 illustrated in FIG. 1. Also, the driving electrode driver 14 and the COG 19 are electrically connected to each other and the driving electrode driver 14 and the plurality of driving electrodes COML are electrically connected to each other, respectively. In addition, the driving electrode driver 14 includes the lead wirings WRC for electrically connecting each of the plurality of driving electrodes COML and the driving electrode driver 14.

Also in the second embodiment, similarly to the first embodiment, various transparent substrates, for example, a glass substrate, a film made of resin or the like may be used as the substrate 21 and the substrate 31.

<Display Device with Touch Sensing Function>

Figure 23:
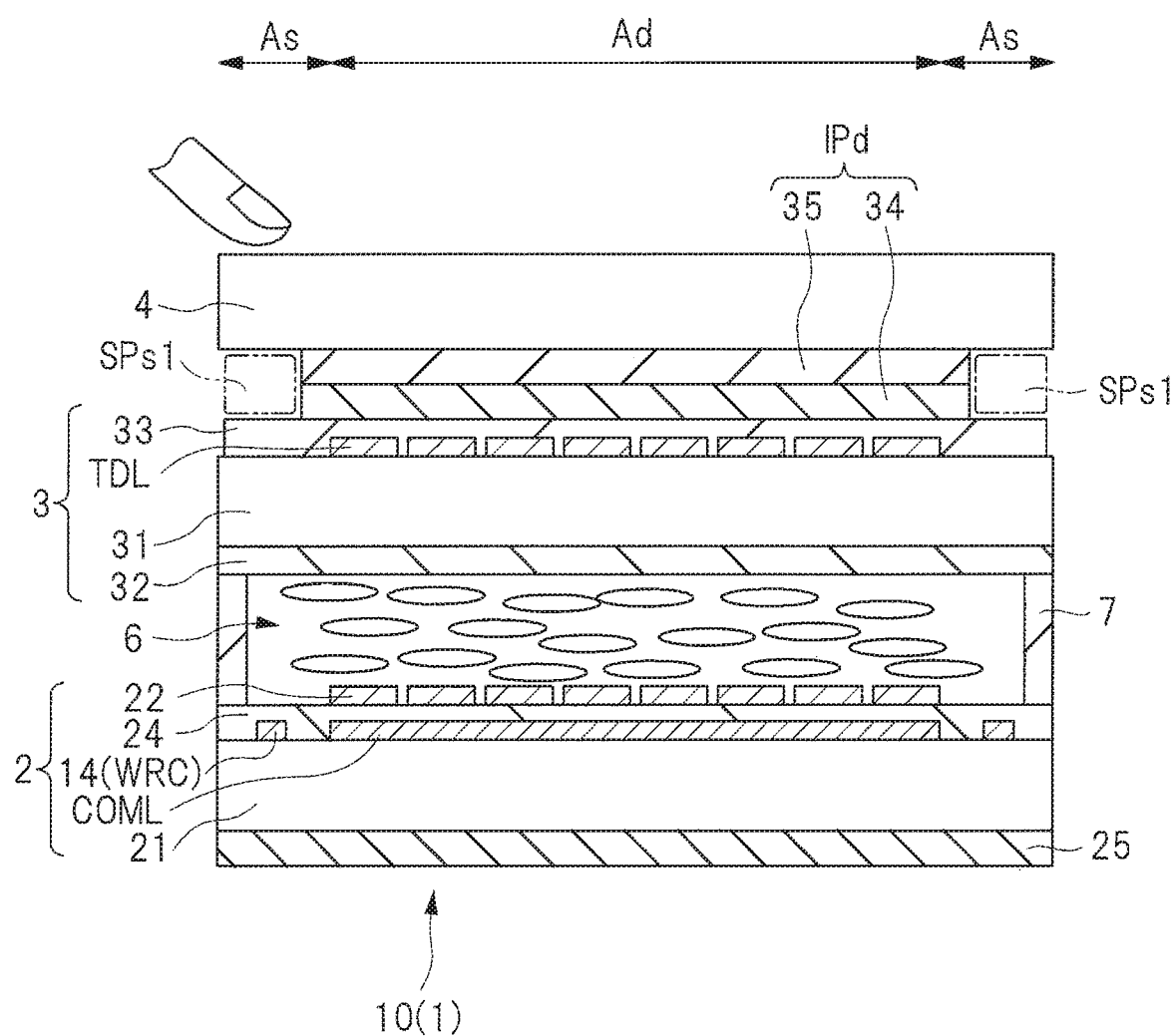
FIG. 23 is a cross-sectional view illustrating a display device with a touch sensing function in the display apparatus according to the second embodiment.

FIG. 23 is a cross-sectional view illustrating the display device with a touch sensing function in the display apparatus according to the second embodiment. FIG. 24 is a circuit diagram illustrating the display device with a touch sensing function in the display apparatus according to the second embodiment. FIG. 23 is a cross-sectional view taken along the line A-A of FIG. 22.

Also in the second embodiment, similarly to the first embodiment, the display device 10 with a touch sensing function includes the array substrate 2, the opposing substrate 3, the cover plate 4, the liquid crystal layer 6 and the sealing part 7. The opposing substrate 3 is provided so that the upper surface serving as a main surface of the array substrate 2 faces the lower surface serving as a main surface of the opposing substrate 3. The liquid crystal layer 6 is provided between the array substrate 2 and the opposing substrate 3.

The array substrate 2 includes the substrate 21 and the opposing substrate 3 includes the substrate 31.

The substrate 31 has the upper surface serving as one main surface and the upper surface of the substrate 31 includes a display region Ad and a peripheral region As positioned on the outer peripheral side of the substrate 31 relative to the display region Ad. Therefore, the peripheral region As is the region of the upper surface of the substrate 31 and is positioned on the outer peripheral side of the substrate 31 relative to the display region Ad. Also, the display region Ad and the peripheral region As may be included in the lower surface serving as the other main surface of the substrate 31.

Alternatively, the display region Ad and the peripheral region As may be included in the upper surface serving as one main surface of the substrate 21. At this time, the substrate 21 has an upper surface serving as one main surface and the upper surface of the substrate 21 has the display region Ad and the peripheral region As as the region positioned on an outer peripheral side of the substrate 21 relative the display region Ad. Therefore, the peripheral region As is the region of the upper surface of the substrate 21 and is positioned on the outer peripheral side of the substrate 21 relative to the display region Ad.

Figure 24:
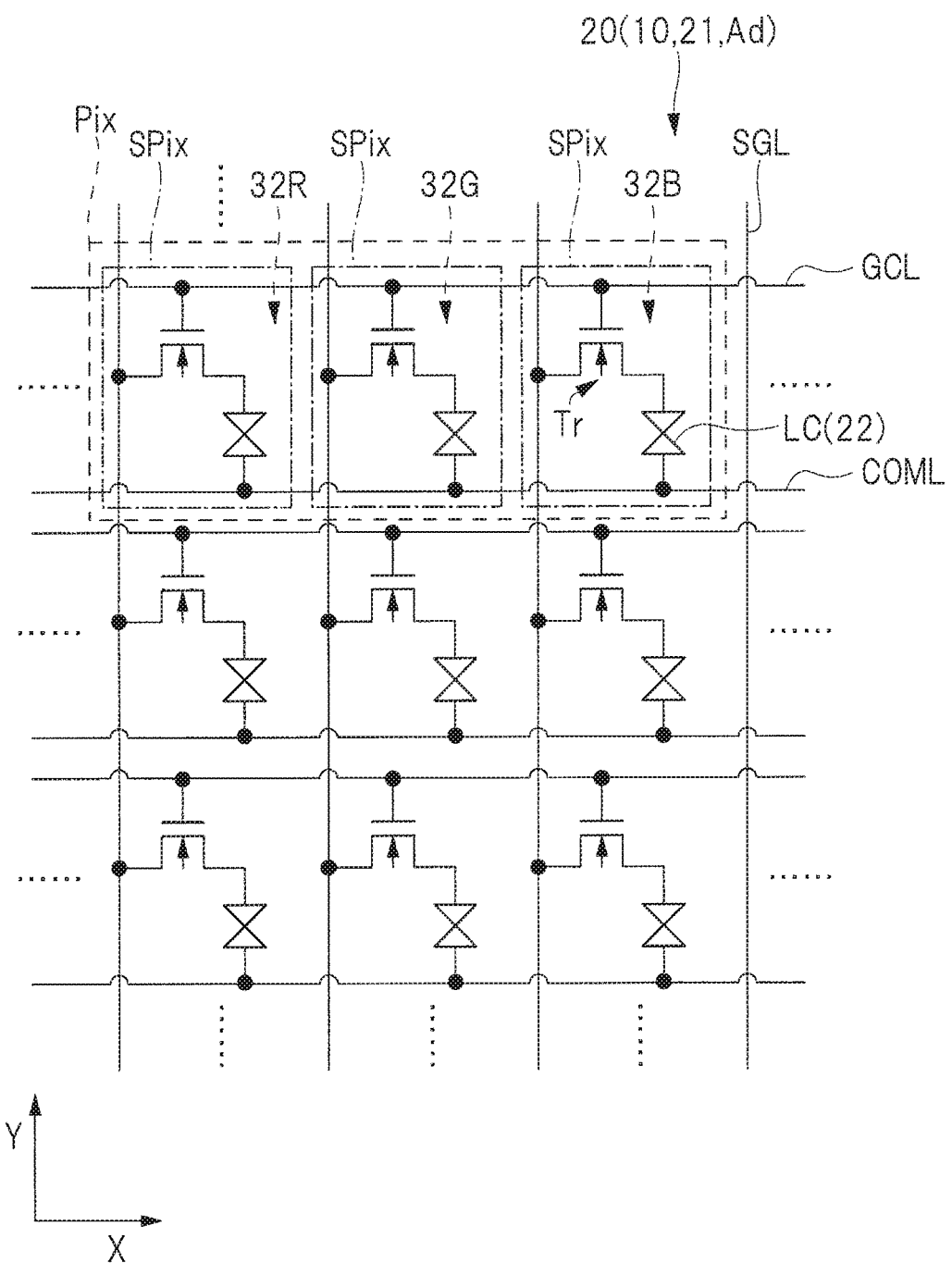
FIG. 24 is a circuit diagram illustrating the display device with a touch sensing function in the display apparatus according to the second embodiment.

As illustrated in FIG. 24, in the display region Ad, a plurality of scanning lines GCL, a plurality of signal lines SGL and a plurality of TFT elements Tr are formed on the substrate 21. Note that, in FIG. 23, the illustrations of the scanning lines GCL, the signal lines SGL and the TFT elements Tr are omitted.

Also in the second embodiment, similarly to the first embodiment, as illustrated in FIG. 24, the plurality of scanning lines GCL respectively extend in the X axis direction and are arrayed in the Y axis direction in the display region Ad. The plurality of signal lines SGL respectively extend in the Y axis direction and are arrayed in the X axis direction in the display region Ad. Thus, sub-pixels SPix are arranged at intersections between the plurality of scanning lines Get and the plurality of signal lines SGL which intersect with each other when seen in a plan view, and a single pixel Pix is formed from a plurality of sub-pixels SPix having different colors. The TFT element Tr is made up of, for example, a thin film transistor such as a n-channel MOS.

Also in the second embodiment, similarly to the first embodiment, as illustrated in FIG. 22 and FIG. 23, the array substrate 2 includes the plurality of driving electrodes COML, the lead wirings WRC, the insulating film 24 and the plurality of pixel electrodes 22. Also, as illustrated in FIG. 23 and FIG. 24, each of the plurality of pixel electrodes 22 is formed in each of the plurality of sub-pixels SPix arrayed in a matrix form in the X axis direction and the Y axis direction in the display region Ad when seer in a plan view.

In the second embodiment, the lead wirings WRC are included in the driving electrode driver 14. The driving electrode driver 14 including the lead wirings NRC electrically connects the driving electrodes COML and the COG 19.

In the example illustrated in FIG. 23, similarly to the case described in the first embodiment with reference to FIG. 6, each of the plurality of driving electrodes COML is formed between the substrate 21 and the pixel electrodes 22. Also, as schematically illustrated in FIG. 24, each of the plurality of driving electrodes COML is provided so as to overlap the plurality of pixel electrodes 22 when seen in a plan view. Then, by applying voltage between each of the plurality of pixel electrodes 22 and each of the plurality of driving electrodes COML so that an electric field is formed in the liquid crystal element LC provided in each of the plurality of sub-pixels SPix, an image is displayed in the display region Ad.

Also in the second embodiment, similarly to the first embodiment, the display control unit for controlling the image display is formed of the liquid crystal element LC, the plurality of pixel electrodes 22, the driving electrode COML, the plurality of scanning lines GCL and the plurality of signal lines SGL. Also, the arrangement of the plurality of driving electrodes COML, and the pixel electrodes 22, the liquid crystal layer 6 and the alignment film can be the same as those in the first embodiment.

Also in the second embodiment, similarly to the first embodiment, as illustrated in FIG. 24, the plurality of sub-pixels SPix arrayed in the X axis direction, that is, the plurality of sub-pixels SPix which belong to the same row of the liquid crystal display device 20 are connected to each other by the scanning line GCL. The scanning lines GCL are connected to the gate driver 12 (see FIG. 1) and scanning signals Vscan (see FIG. 1) are supplied thereto from the gate driver 12. Also, the driving electrodes COML are connected to the driving electrode driver 14 (see FIG. 1) and driving signals Vcom (see FIG. 1) are supplied thereto from the driving electrode driver 14.

On the other hand, in the example illustrated in FIG. 24, unlike the first embodiment, the plurality of sub-pixels Pix which belong to the same row share one driving electrode COML. The plurality of driving electrodes COML respectively extend in the X axis direction and are arrayed in the Y axis direction in the display region Ad. As described above, since the plurality of scanning lines GCL respectively extend in the X axis direction and are arrayed in the Y axis direction in the display region Ad, the direction in which each of the plurality of driving electrodes COML extends is parallel to the direction in which each of the plurality of scanning lines GCL extends.

As illustrated in FIG. 22, the COG 19 is provided in the peripheral region As positioned on one side of the display region Ad in the Y axis direction. Thus, the driving electrode driver 14 including the lead wirings WRC includes extension parts EX2 extending in the Y axis direction. The driving electrode driver 14 including the lead wirings WRC includes a plurality of connection parts CN2 for connecting the extension parts EX2 and the plurality of driving electrodes COML, respectively. The connection parts CN2 extend in, for example, a direction intersecting with the Y axis direction in which the extension parts EX2 extend such as the X axis direction. The ends of the connection parts CN2 on the side close to the driving electrode COML are connected to the driving electrodes COML and the ends of the connection parts CN2 on the side close to the COG 19 are connected to the ends of the extension parts EX2 on the side close to the driving electrode COML. The extension parts EX2 and the connection parts CN2 are provided in the peripheral region As on the upper surface of the substrate 21.

Note that the driving electrode driver 14 including the lead wirings NRC may include the connection parts CT2 for connecting the extension parts EX2 and the COG 19 depending on a position of the COG 19 in the X axis direction. The connection parts CT2 are also provided on the upper surface of the substrate 21.

Note that the driving electrode driver 14 including the lead wirings WRC, which is arranged in the peripheral region As when seen in a plan view, is illustrated in both of the plan view of FIG. 22 and the cross-sectional view of FIG. 23.

The display operation using the gate driver 12, the source driver 13 and the driving electrode driver 14 in the liquid crystal display device 20 in the display apparatus according to the second embodiment can also be performed in the same manner as the display operation in the liquid crystal display device 20 in the display apparatus according to the first embodiment.

The driving electrodes COML in the display apparatus 1 according to the second embodiment also operate as the driving electrodes for the liquid crystal display device 20 and operate as the driving electrodes for the touch sensing device 30 similarly to the driving electrodes COML in the display apparatus 1 according to the first embodiment.

Also in the second embodiment, similarly to the first embodiment, the touch sensing device 30 includes the plurality of driving electrodes COML provided on the array substrate 2 and the plurality of sensing electrodes TDL provided on the opposing substrate 3. The plurality of sensing electrodes TDL extend in a direction intersecting with the direction in which each of the plurality of driving electrodes COML extends when seen in a plan view. Then, signals in accordance with electrostatic capacitance between each of the plurality of driving electrodes COML and each of the plurality of sensing electrodes TDL are generated and the generated signals are detected through the driving electrode driver 14 including the lead wirings WRC and the lead wirings WRT, thereby sensing input positions. More specifically, the sensing unit for sensing the input positions, that is, the input device is formed from an electrode substrate having the sensing electrodes TDL formed thereon such as the substrate 31 (see FIG. 23) and the driving electrodes COML.

In both of the first embodiment and the second embodiment, driving signals are supplied to the driving electrodes COML by the lead wirings WRC and sensing signals are detected through the lead wirings WRT. Also, in the first embodiment, for example, since the spaces SPs1 (see FIG. 6) are arranged so as to overlap the lead wirings WRT in the peripheral region As when seen in a plan view, the effect of preventing the noises from entering the sensing signals detected through the lead wirings WRT can be achieved. On the other hand, in the second embodiment, for example, since the spaces SPs1 (see FIG. 23) are arranged so as to overlap the driving electrode driver 14 including the lead wirings WRC in the peripheral region As when seen in a plan view, the effect of preventing the noises from entering the driving signals supplied to the driving electrodes COML by the lead wirings WRC can be achieved.

The touch sensing operation in the touch sensing device 30 in the display apparatus according to the second embodiment can be performed in the same manner as the touch sensing operation in the touch sensing device 30 in the display apparatus according to the first embodiment.

As described in the first embodiment with reference to FIG. 8, the plurality of driving electrodes COML and the plurality of sensing electrodes TDL which intersect with each other when seen in a plan view form an electrostatic capacitive touch sensor having a matrix arrangement. Accordingly, by scanning the entire touch sensing surface of the touch sensing device 30, positions which a finger or the like is in contact with or approaches can be sensed.

Also, similarly to the touch sensing device 30 of the first embodiment, the touch sensing device 30 of the self-capacitance method may be used as the touch sensing device 30 of the second embodiment.

Also in the second embodiment, similarly to the first embodiment, as illustrated in FIG. 22 and FIG. 23, the opposing substrate 3 includes the substrate 31, the color filter layer 32, the sensing electrodes TDL, the lead wirings WRT and the protective film 33. However, since the sensing electrodes TDL extend in the Y axis direction when seen in a plan view as illustrated in FIG. 22, the lead wirings WRT are not arranged in the peripheral region As when seen in a plan view in the cross section of FIG. 23.

Also in the second embodiment, similarly to the first embodiment, as illustrated in FIG. 23, the cover plate 4 as a substrate is provided on a side opposite to the array substrate 2 with the opposing substrate 3 interposed therebetween. More specifically, the cover plate 4 is provided so as to face the upper surface of the opposing substrate 3 in the display region Ad and the peripheral region As.

Also in the second embodiment, similarly to the first embodiment, each of the plurality of sensing electrodes TDL arrayed in the X axis direction may have a mesh shape formed of a plurality of conductive lines when seen in a plan view and may have a zigzag shape extending in the Y axis direction as a whole while being alternately bent in the opposite directions when seen in a plan view.

<Arrangement of Insulator Parts on Protective Film>

Next, an arrangement of insulator parts on the protective film will be described with reference to FIG. 22 and FIG. 23.

As illustrated in FIG. 22 an FIG. 23, the insulator part IPd is provided on the protective film 33 in the display region Ad. More specifically, the insulator part IPd is provided on the protective film 33 and is arranged so as to overlap the display region Ad when seen in a plan view. In other words, the insulator part IPd is provided on the upper surface of the substrate 31 via the protective film 33 and is arranged so as to overlap the display region Ad when seen in a plan view.

The insulator part IPd includes, for example, the polarization plate 34 and the resin 35. The polarization plate 34 is provided on the upper surface serving as a main surface of the substrate 31 via the protective film 33. The resin 35 is provided on the polarization plate 34. The cover plate 4 is provided on the resin 35 and is adhered to the polarization plate 34 by the resin 35. Note that a structure of the polarization plate 34 will be described later.

As illustrated in FIG. 23, the spaces SPs1 are provided in the same layer as the insulator part IPd on the protective film 33 so as to overlap the driving electrode driver 14 including the lead wirings WRC of the driving electrodes COML in the peripheral region As when seen in a plan view. More specifically, the spaces SPs1 are provided at sides of the insulator part IPd and are arranged so as to overlap the driving electrode driver 14 including the lead wirings WRC in the peripheral region As when seen in a plan view. The permittivity of the space SPs1 is lower than the permittivity of the insulator part IPd. Thus, as described later with reference to FIG. 25, when a finger or an input tool approaches the cover plate 4 in the peripheral region As, electrostatic capacitance between the driving electrode driver 14 including the lead wirings WRC and the finger or input tool is relatively decreased.

Alternatively, as described in the first embodiment with reference to FIG. 9, the insulator parts IPs with a permittivity lower than the permittivity of the insulator part IPd may be provided in the same layer as the insulator part IPd on the protective film 33 so as to overlap the driving electrode driver 14 including the lead wirings WRC of the driving electrodes COML in the peripheral region As when seen in a plan view. More specifically, the insulator parts IPs may be provided at sides of the insulator part IPd and may be arranged so as to overlap the driving electrode driver 14 including the lead wirings WRC in the peripheral region As when seen in a plan view. Also in such a case, when a finger or an input tool approaches the cover plate 4 in the peripheral region As, electrostatic capacitance between the driving electrode driver 14 including the lead wirings WRC and the finger or input tool is relatively decreased.

Also in the second embodiment, similarly to the first embodiment, the insulator part IPd may be provided from the entire display region Ad to the part of the peripheral region As when seen in a plan view.

Also, as described in the first embodiment with reference to FIG. 10, the insulator part IPd may include the polarization plate 34 and the space SPd may be provided between the polarization plate 34 and the cover plate 4. Then, the spaces SPs2 may be provided at sides of the space SPd and may be arranged so as to overlap the driving electrode driver 14 including the lead wirings WRC in the peripheral region As when seen in a plan view. Also in such a case, when a finger or an input tool approaches the cover plate 4 in the peripheral region As, electrostatic capacitance between the driving electrode driver 14 including the lead wirings WRC and the finger or input tool is relatively decreased.

<Noise Reduction in Peripheral Region>

Figure 25:
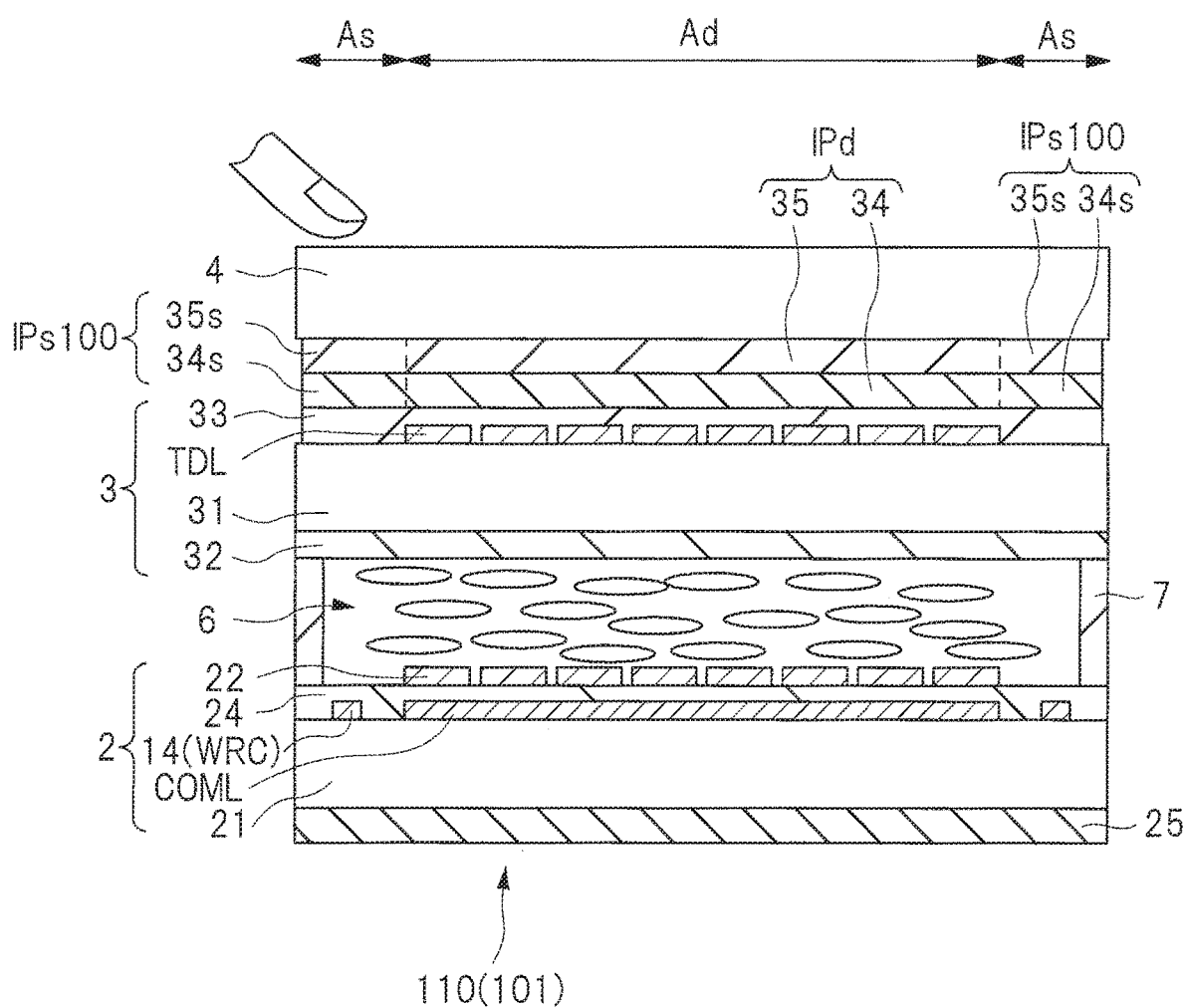
FIG. 25 is a cross-sectional view illustrating a display device with a touch sensing function in a display apparatus according to a comparative example 2.

Next, the noise reduction in the peripheral region in the display apparatus according to the second embodiment will be described in comparison with a display apparatus according to a comparative example 2. FIG. 25 is a cross-sectional view illustrating a display device with a touch sensing function in the display apparatus according to the comparative example 2.

Also in the display device 110 with a touch sensing function in the display apparatus 101 according to the comparative example 2, similarly to the display apparatus according to the second embodiment, the insulator part IPd is provided on the protective film 33 in the display region Ad when seen in a plan view. More specifically, the insulator part IPd is provided on the protective film 33 and is arranged so as to overlap the display region Ad when seen in a plan view. The insulator part IPd includes the polarization plate 34 provided on the protective film 33 and the resin 35 provided on the polarization plate 34.

However, in the display device 110 with a touch sensing function in the display apparatus 101 according to the comparative example 2, the insulator parts IPs100 are formed in the same layer as the insulator part IPd on the protective film 33 so as to overlap the driving electrode driver 14 including the lead wirings WRC of the driving electrodes COML in the peripheral region As when seen in a plan view. The insulator part IPs100 includes the polarization plate 34s provided on the protective film 33 and the resin 35s provided on the polarization plate 34s.

The polarization plate 34s is formed in the same layer as the polarization plate 34 and is made of the same kind of material as the polarization plate 34. The resin 35s is formed in the same layer as the resin 35 and is made of the same kind of material as the resin 35. More specifically, in the comparative example 2, the insula part IPs100 is made of the same kind of material as the insulator part IPd, and the permittivity of the insulator part IPs100 is not lower than the permittivity of the insulator part IPd.

Therefore, when a finger or an input tool approaches the cover plate 4 in the peripheral region As, electrostatic capacitance between the driving electrode driver 14 including the lead wirings WRC and the finger or input tool is relatively increased. Thus, when a finger or an input tool approaches the cover plate 4 in the peripheral region As, noises from the finger or input tool are likely to be transmitted to the driving electrode driver 14 including the lead wirings WRC. Then, the signals input to the driving electrodes COML via the driving electrode driver 14 including the lead wirings WRC are likely to be affected by noises, so that a ratio of a signal intensity to a noise intensity, that is, an SN ratio decreases.

On the other hand, in the second embodiment, as illustrated in FIG. 23, the insulator parts IPs (see FIG. 9) or the spaces SPs1 with the permittivity lower than the permittivity of the insulator part IPd are provided at sides of the insulator part IPd, and the insulator parts IPs or the spaces SPs1 are arranged so as to overlap the driving electrode driver 14 including the lead wirings WRC in the peripheral region As when seen in a plan view. Both of the permittivity of the insulator part IPs and the permittivity of the space SPs1 are lower than the permittivity of the insulator part IPd. Thus, when a finger or an input tool approaches the cover plate 4 in the peripheral region As, the electrostatic capacitance between the driving electrode driver 14 including the lead wirings WRC and the finger or input tool is relatively decreased. Therefore, when a finger or an input tool approaches the cover plate 4 in the peripheral region As, noises from the finger or input tool are less likely to be transmitted to the driving electrode driver 14 including the lead wirings WRC. Accordingly, the signals input through the driving electrode driver 14 including the lead wirings WRC to the driving electrodes COPAL are less likely to be affected by the noises and the SN ratio increases, so that the sensing performance of the input device can be improved.

Further, in the second embodiment, the insulator part IPd with a relatively high permittivity is provided so as to overlap the display region Ad when seen in a plan view. Thus, when a finger or an input tool approaches the cover plate 4 in the display region Ad, electrostatic capacitance between the sensing electrodes TDL and the finger or input tool is relatively increased. Therefore, the sensing performance of the input device can be improved.

Furthermore, the insulator parts IPs or the spaces SPs1 are preferably arranged so as to overlap also the connection parts CN2 in addition to the extension parts EX2 when seen in a plan view. In this manner, when a finger or an input tool approaches the cover plate 4 in the peripheral region As, noises from the finger or input tool are much less likely to be transmitted to the driving electrode driver 14 including the lead wirings WRC in comparison with the case where the insulator parts IPs or the spaces SPs1 are arranged so as to overlap only the extension parts EX2 when seen in a plan view.

Note that, even when some wirings for sensing input positions other than the lead wirings WRT and the driving electrode driver 14 including the lead wirings WRC are arranged in the peripheral region As, the insulator parts IPs or the spaces SPs1 can be arranged so as to overlap the wirings in the peripheral region As when seen in a plan view.

Also in such a case, when a finger or an input tool approaches the cover plate 4 in the peripheral region As, noises from the finger or input tool are less likely to be transmitted to the wirings.

<Support Structure by Backlight Frame>

The support structure by the backlight frame 52 described in the first embodiment with reference to FIG. 12 and FIG. 13 can be applied also to the second embodiment. Also, the case where the cover plate 4 is not provided, the height position of the upper end of the frame part 54 of the backlight frame 52 is higher than the height position of the upper surface of the protective film 33, the spaces SPs1 are provided at sides of the insulator part IPd, and the spaces SPs1 are arranged so as to overlap the driving electrode driver 14 including the lead wirings WRC in the peripheral region As when seen in a plan view as described with reference to FIG. 12 will be considered. In such a case, the space SPs1 is a trench part TR1 provided between the insulator part IPd and the frame part 54 of the backlight frame 52.

Also in such a case, similarly to the first embodiment, electrostatic capacitance between the driving electrode driver 14 including the lead wirings WRC and a finger or an input tool when the finger or input tool approaches the cover plate 4 in the peripheral region As when seen in a plan view can be decreased in comparison with the case where the spaces SPs1 as the trench parts TR1 are not provided.

<Polarization Plate>

The structure of the polarization plate described in the first embodiment with reference to FIG. 14 to FIG. 16 can be applied also to the second embodiment. Also, similarly to the first embodiment, when the polarization plate 34 includes the conductive layer 62, by providing the insulator parts IP (see FIG. 9) or the spaces SPs1 with a permittivity lower than the permittivity of the insulator part IPd at sides of the insulator part IPd, the effect that noises are less likely to be generated in the peripheral region As can be increased. Therefore, when a finger or an input tool approaches the cover plate 4 in the peripheral region As, noises from the finger or input tool are much less likely to be transmitted to the driving electrodes COML, and signals detected by the input device are less likely to be affected by noises, so that the SN ratio can further increase.

Also in the second embodiment, similarly to the first embodiment, when the insulator parts IPs with a permittivity lower than the permittivity of the insulator part IPd are provided at sides of the insulator part IPd in the peripheral region As as illustrated in FIG. 9 and the polarization plate 34 includes the conductive layer 62 as illustrated in FIG. 14, it is preferable that the insulator parts IPs do not include a conductive layer. In this manner, it is possible to prevent or suppress influence of noises in the display region Ad from reaching the peripheral region As.

<Material of Protective Film>

Figure 26:
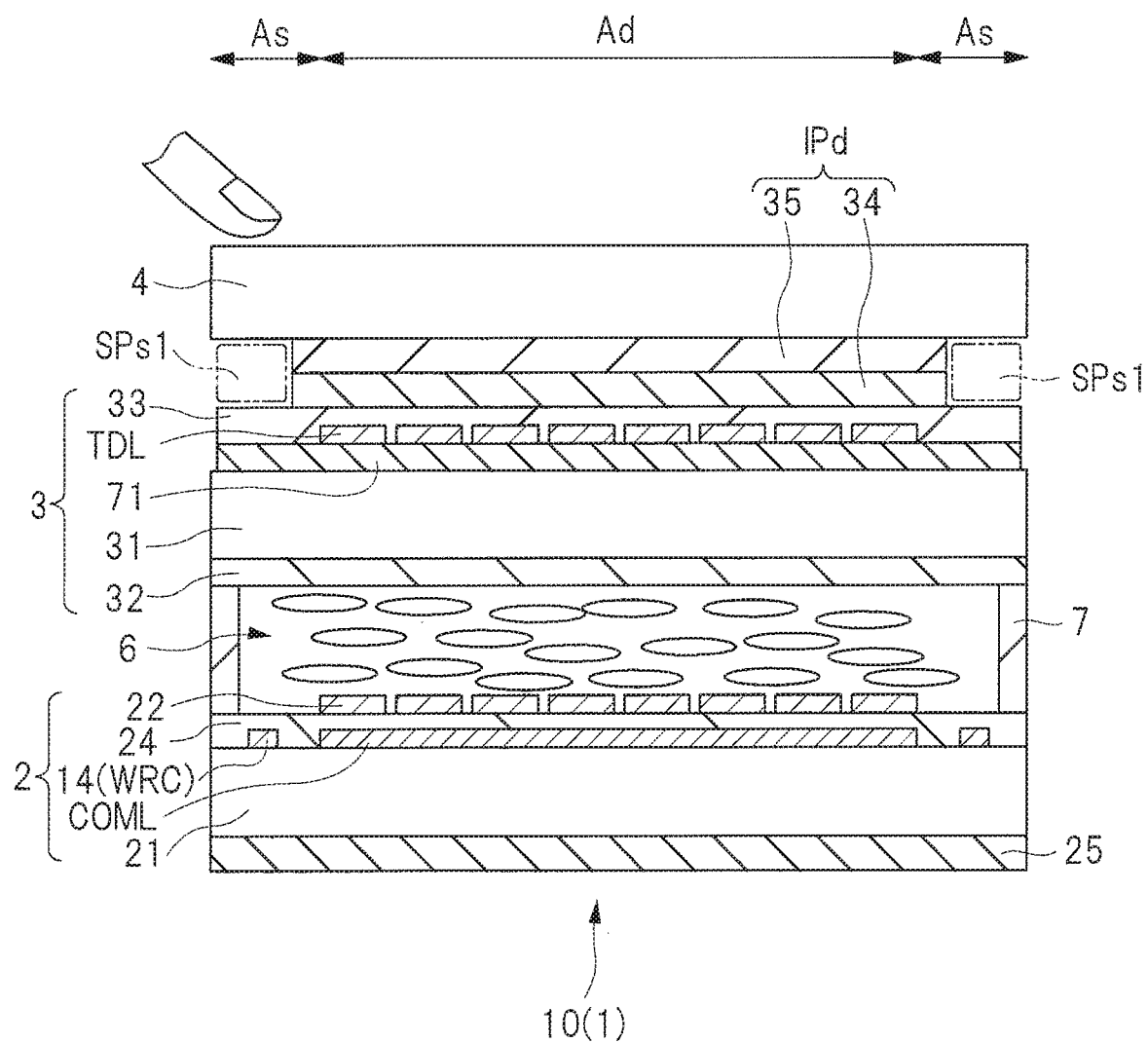
FIG. 26 is a cross-sectional view illustrating another example of the display device with a touch sensing function in the display apparatus according to the second embodiment.
Figure 27:
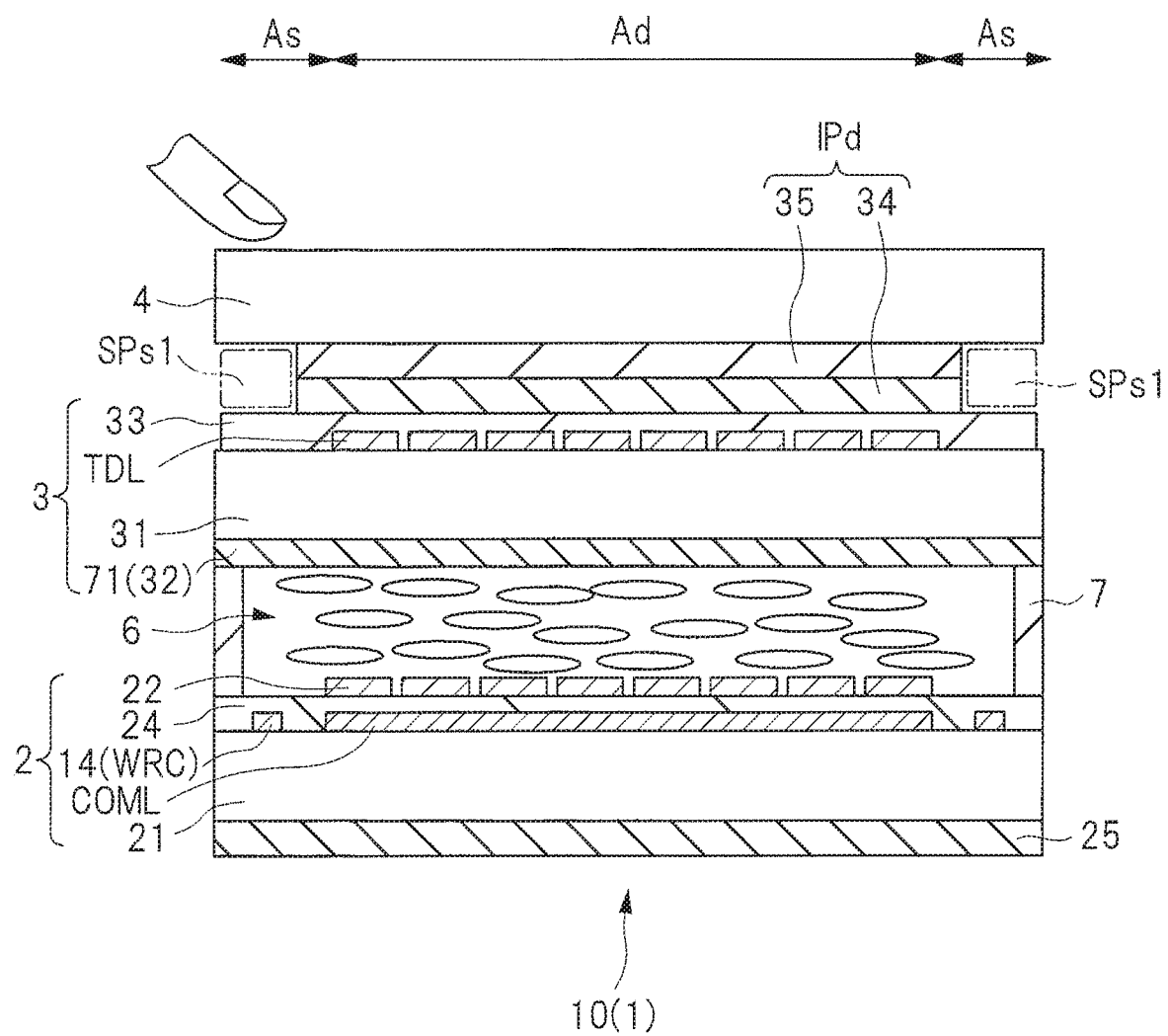
FIG. 27 is a cross-sectional view illustrating another example of the display device with a touch sensing function in the display apparatus according to the second embodiment.

Next, a material of the protective film will be described below with reference to FIG. 26 and FIG. 27. FIG. 26 and FIG. 27 are cross-sectional views illustrating other examples of the display device with a touch sensing function in the display apparatus according to the second embodiment.

The material of the protective film described in the first embodiment with reference to FIG. 17 and FIG. 18 can be applied also to the second embodiment. More specifically, preferably, the protective film 33 is made of an ultraviolet curable material and the ultraviolet ray absorption layer 71 is provided on a side opposite to the array substrate 2 with the liquid crystal layer 6 interposed therebetween, that is, between the liquid crystal layer 6 and the protective film 33.

In this manner, similarly to the first embodiment, a thermal processing does not need to be performed for forming the protective film 33, and it is possible to prevent or suppress the liquid crystal layer 6 or the alignment films (not illustrated) from being irradiated with an ultraviolet ray and being decomposed and modified.

In the example illustrated in FIG. 26, the ultraviolet ray absorption layer 71 is provided on the upper surface serving as one main surface of the substrate 31 and the protective film 33 is provided on the ultraviolet, ray absorption layer 71. More specifically, the ultraviolet ray absorption layer 71 is arranged immediately below the protective film 33. In the example illustrated in FIG. 26, the ultraviolet ray absorption layer 71 may be provided with a function of improving an adhesiveness of the protective film 33 to the substrate 31.

In the example illustrated in FIG. 27, the ultraviolet ray absorption layer 71 is provided on the lower surface serving as the other main surface of the substrate 31. In the example illustrated in FIG. 27, the ultraviolet ray absorption layer 71 serves also as the color filter layer 32, but is preferably provided so as to cover the entire region in which the liquid crystal layer 6 is arranged when seen in a plan view. Further, though not illustrated, the ultraviolet ray absorption layer 71 may be provided between the substrate 31 and the color filter layer 32, or may be provided separately from the color filter layer 32 on a side opposite to the sub rate 31 with the color filter 32 interposed therebetween on the side closer to the substrate 31 relative to the alignment film (not illustrated).

Alternatively, similarly to the first embodiment, the protective film 33 is made of a thermosetting material. Thus, since a protective film, made of an ultraviolet curable material does not need to be formed, the material cost can be reduced.

Also, similarly to the first embodiment, a sheet resistance of the protective film 33 is preferably $1 \times 10^9$ Ω/square or more. Thus, similarly to the first embodiment, it is possible to prevent or suppress the sensing electrodes TDL covered with the protective film 33 from being short-circuited, and the sensing performance of the input device can be improved.

<Adhesive Force of Polarization Plate to Protective Film>

Also in the second embodiment, as described in the first embodiment with reference to FIG. 19 to FIG. 21, the adhesive force of the protective film 33 to the substrate 31 is larger than the adhesive force of the polarization plate 34 to the protective film 33. Accordingly, when the protective film 33 is formed on the substrate 31 and then the polarization plate 34 is adhered onto the protective film 33 by the use of, for example, the adhesive layer 61 (see FIG. 14), even if the position of the polarization plate 34 is dislocated from a desired position, the polarization plate 34 can be released from the protective film 33 and can be adhered again. Thus, the spaces SPs1 (see FIG. 23) or the like can be provided at sides of the insulator part IPd including the polarization plate 34 with an excellent positional accuracy. Therefore, when a finger or an input tool approaches the cover plate 4 in the peripheral region As, electrostatic capacitance between the driving electrode driver 14 including the lead wirings WRC and the finger or input tool can be relatively decreased.

<Main Characteristic and Effect of Present Embodiment>

In the display apparatus according to the second embodiment, the insulator parts IPs or the spaces SPs1 are provided at sides of the insulator part IPd and are arranged so as to overlap the driving electrode driver 14 including the lead wirings WRC in the peripheral when seen in a plan view. Both of the permittivity of the insulator part IPs and the permittivity of the space SPs1 are lower than the permittivity of the insulator part IPd. Therefore, when a finger or an input tool approaches the cover plate in the peripheral region As, electrostatic capacitance between the driving electrode driver 14 including the lead wirings WRC and the finger or input tool is relatively decreased. Therefore, when a finger or an input tool approaches the cover plate 4 in the peripheral region As, noises are less likely to be transmitted to the driving electrode driver 14 including the lead wirings WRC, and signals detected by the input device are less likely to be affected by the noises, so that the SN ratio increases.

More specifically, in the display apparatus according to the second embodiment, since the insulator parts IPs or the spaces SPs1 are arranged so as to overlap the driving electrode driver 14 including the lead wirings WRC in the peripheral region As when seen in a plan view, the effect of preventing the noises from entering the driving signals supplied to the driving electrodes COML by the lead wirings WRC can be achieved.

In the second embodiment, the case in which the driving electrodes COML and the driving electrode driver 14 including the lead wirings WRC are formed on the upper surface of the substrate 21 has been described. However, the display device 10 with a touch sensing function in the display apparatus 1 according to the second embodiment is applicable also to the case where the driving electrodes COML and the driving electrode driver 14 including the lead wirings WRC are formed on the lower surface of the substrate 21 or on the upper surface or lower surface of the substrate 31. Also in such a case, by providing the insulator parts IPs or the spaces SPs1 with a permittivity lower than the permittivity of the insulator part IPd at sides of the insulator part IPd, noises from a finger or an input tool are less likely to be transmitted to the driving electrode driver 14 including the lead wirings WRC.

In the foregoing, the invention made by the inventors of the present invention has been concretely described based on the embodiments. However, it is needless to say that the present invention is not limited to the foregoing embodiments and various modifications and alterations can be made within the scope of the present invention.

Further, in the foregoing embodiments, the cases of a liquid crystal display device have been illustrated as disclosure examples, but all kinds of flat-panel display devices such as an organic EL display device, other self-luminous type display devices and electronic paper display devices having electrophoresis elements may be listed as other application examples. Further, it goes without saying that the present invention is applicable to small, medium and large sized devices without any particular limitation.

In the category of the idea of the present invention, a person with ordinary skill in the art can conceive various modified examples and revised examples, and such modified examples and revised examples are also deemed to belong to the scope of the present invention.

For example, the examples obtained by appropriately making the additions, deletions or design changes of components or the additions, deletions or condition changes of processes to respective embodiments described above by a person with ordinary skill in the art also belong to the scope of the present invention as long as they include the gist of the present invention.

What is claimed is:

1. A touch sensing device comprising: a first electrode provided in a first region on a first substrate; a first wiring provided in a second region and connected to the first electrode in the first region on the first substrate; a protective film covering the first electrode and the first wiring; a resin insulated layer provided in the first region on the protective film; a second insulated layer provided in the second region on the protective film; and a cover plate provided on the resin insulated layer and the second insulated layer, wherein a permittivity of the resin insulated layer is higher than a permittivity of the second insulated layer, the resin insulated layer is arranged so as to overlap the first region, and so as not to overlap the second region, the first electrode is arranged between the resin insulated layer and the first substrate, and an adhesive force of the protective film to the first substrate is larger than an adhesive force of the resin insulated layer to the protective film.

2. The touch sensing device according to claim 1, wherein a sheet resistance of the protective film is $1 \times 10^9$ Ω/square or more.

3. A touch sensing device comprising: a first electrode provided in a first region on a first substrate; a first wiring provided in a second region and connected to the first electrode in the first region on the first substrate; a protective film covering the first electrode and the first wiring; a resin insulated layer provided in the first region on the protective film; an air layer provided in the second region on the protective film; and a cover plate provided on the resin insulated layer and the air layer, wherein a permittivity of the resin insulated layer is higher than a permittivity of the air layer, the resin insulated layer is arranged so as to overlap the first region, and so as not to overlap the second region, the first electrode does not overlap the air layer in a plan view, the first electrode is arranged between the resin insulated layer and the first substrate, and an adhesive force of the protective film to the first substrate is larger than an adhesive force of the resin insulated layer to the protective film.

4. The touch sensing device according to claim 3, wherein a sheet resistance of the protective film is $1 \times 10^9$ Ω/square or more.

* * * * *